United States Patent
Yoshinaga et al.

(10) Patent No.: US 12,387,496 B2
(45) Date of Patent: Aug. 12, 2025

(54) INFORMATION PROCESSING APPARATUS, CONTROL METHOD OF INFORMATION PROCESSING APPARATUS, AND PROGRAM RECORDING MEDIUM

(71) Applicant: CANON KABUSHIKI KAISHA, Tokyo (JP)

(72) Inventors: Kei Yoshinaga, Kanagawa (JP); Kazuhiko Kobayashi, Kanagawa (JP); Kotaro Yano, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 326 days.

(21) Appl. No.: 18/316,480

(22) Filed: May 12, 2023

(65) Prior Publication Data
US 2023/0386218 A1  Nov. 30, 2023

(30) Foreign Application Priority Data
May 24, 2022  (JP) .................... 2022-084454

(51) Int. Cl.
| | | |
|---|---|---|
| G06V 20/52 | (2022.01) | |
| G06T 11/00 | (2006.01) | |
| G06V 10/74 | (2022.01) | |
| G06V 40/16 | (2022.01) | |
| G06V 40/20 | (2022.01) | |

(52) U.S. Cl.
CPC .............. *G06V 20/52* (2022.01); *G06T 11/00* (2013.01); *G06V 10/761* (2022.01); *G06V 40/172* (2022.01); *G06V 40/20* (2022.01)

(58) Field of Classification Search
CPC .... G06V 20/52; G06V 10/761; G06V 40/172; G06V 40/20; G06V 10/762; G06V 40/23; G06T 11/00
See application file for complete search history.

(56) References Cited

FOREIGN PATENT DOCUMENTS

| | | | | |
|---|---|---|---|---|
| JP | 4339464 B2 | 10/2009 | | |
| JP | 2013012149 A | * 1/2013 | ............. | G08B 25/04 |
| JP | 2020-005412 A | 1/2020 | | |
| KR | 20210117760 A | * 9/2021 | ....... | G08B 13/19602 |

* cited by examiner

*Primary Examiner* — Ryan R Yang
(74) *Attorney, Agent, or Firm* — Cowan, Liebowitz & Latman, P.C.

(57) ABSTRACT

An information processing apparatus as one aspect of the present invention detects a predetermined behavior of a person, specifies first tracking information of a first person for which the predetermined behavior has been detected and second tracking information of a second person for which it is estimated that replacement has occurred during movement of the first person, generates third tracking information based on the first tracking information and the second tracking information, and determines whether or not the first person satisfies a predetermined condition based on a detection result of the predetermined behavior corresponding to the third tracking information.

19 Claims, 14 Drawing Sheets

FIG. 5A

| ID | Time | Coordinates | |
|---|---|---|---|
| 1 | $t_1$ | $(x_{lt11}, y_{lt11}, w_{11}, h_{11})$ | ~ 521 |
| 1 | ⋮ | ⋮ | |
| 1 | $t_n$ | $(x_{lt1n}, y_{lt1n}, w_{1n}, h_{1n})$ | |
| 2 | $t_1$ | $(x_{lt21}, y_{lt21}, w_{21}, h_{21})$ | |
| 2 | ⋮ | ⋮ | |
| 2 | $t_n$ | $(x_{lt2n}, y_{lt2n}, w_{2n}, h_{2n})$ | |
| 3 | $t_1$ | $(x_{lt31}, y_{lt31}, w_{31}, h_{31})$ | |
| 3 | ⋮ | ⋮ | |
| 3 | $t_n$ | $(x_{ltn1}, y_{ltn1}, w_{n1}, h_{n1})$ | |

FIG. 5B

| Behavior information ID | Time | Tracking ID | Behavior type | |
|---|---|---|---|---|
| action1 | $t_1$ | 1 | Pick up an item on shelf | ~ 521 |
| action2 | $t_n$ | 2 | Put the item in bag | ~ 522 |

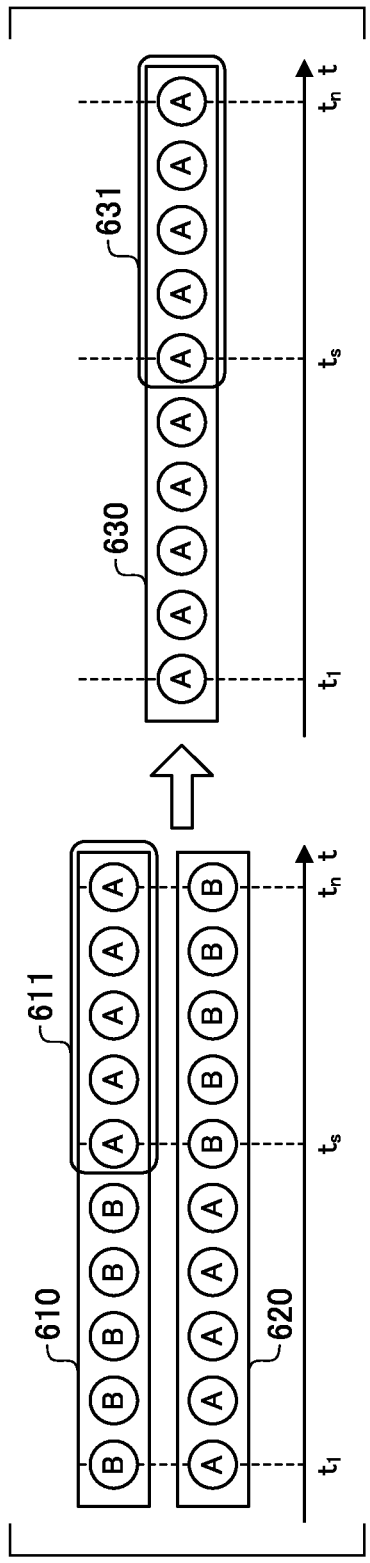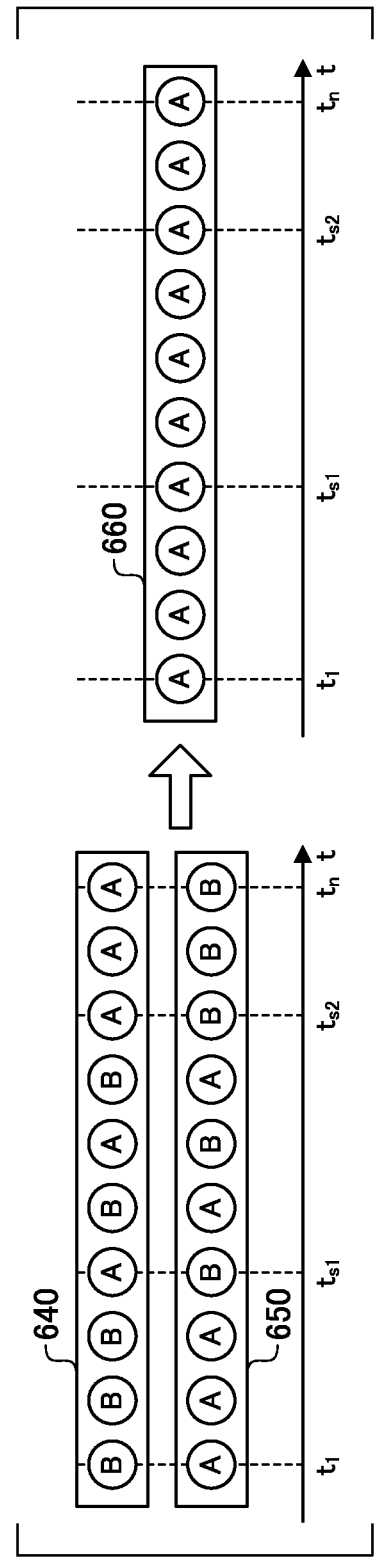

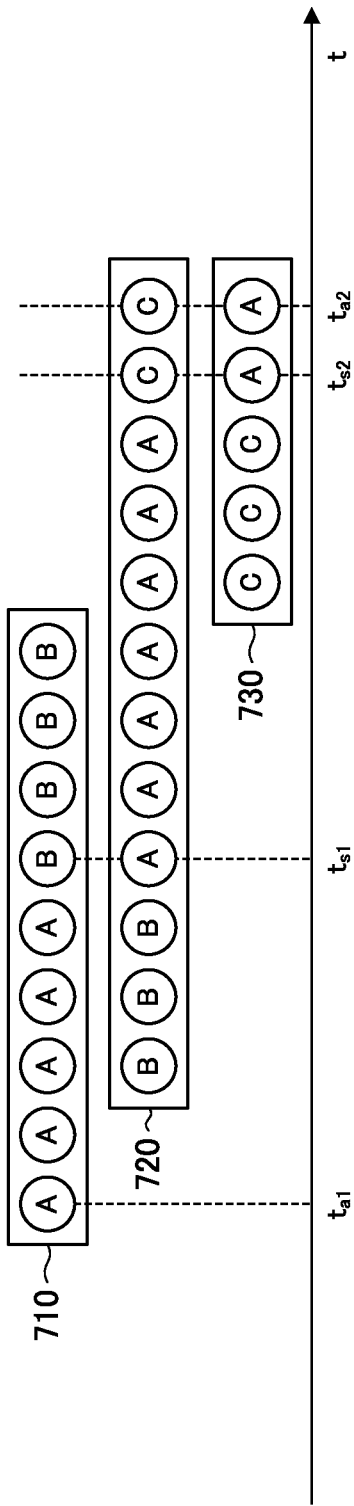
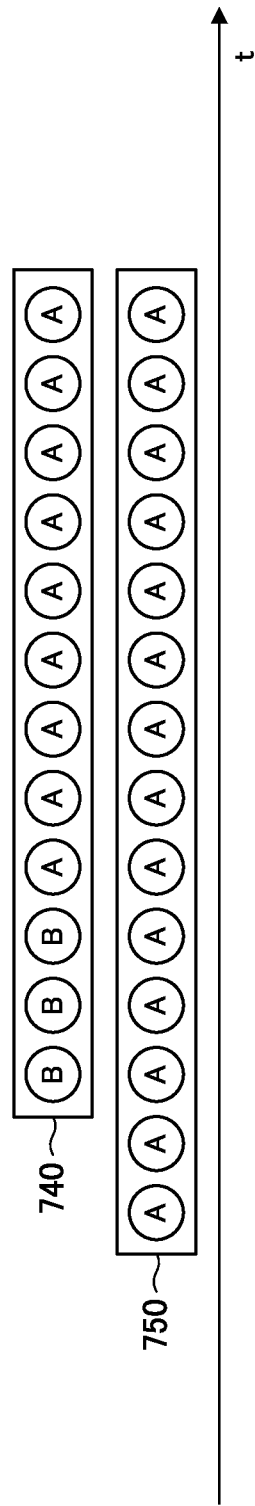
FIG. 7A
FIG. 7B

FIG. 14A

| Provisional tracking ID | Coordinates | | Evaluation value s |
|---|---|---|---|
| | $x_1$ | $x_2$ | |
| temp.1 | 0.9 | 0.3 | 2.0 |
| temp.2 | 0.9 | 0.7 | 2.4 |
| temp.3 | 0.7 | 0.6 | 1.9 |
| temp.4 | 0.8 | 0.8 | 2.2 |
| temp.5 | 0.9 | 0.8 | 2.3 |

FIG. 14B

| Item | Priority | Weight |
|---|---|---|
| $x_1$ | 1 | $w_2$ |
| $x_2$ | 2 | $w_2$ |

INFORMATION PROCESSING APPARATUS, CONTROL METHOD OF INFORMATION PROCESSING APPARATUS, AND PROGRAM RECORDING MEDIUM

BACKGROUND OF THE INVENTION

Field of the Invention

The present invention relates to an information processing apparatus, a control method of the information processing apparatus, and a program recording medium.

Description of the Related Art

Conventionally, there is a technology in which whether or not a person being tracked is a suspicious person is determined based on information on tracking a person in a video image captured by a surveillance camera. When persons being tracked cross each other, the information being tracked from that point in time may be switched between the persons (hereinafter, referred to as "switching"). However, when this phenomenon occurs, there is a drawback in that the processing of determining the suspicious person in the subsequent stage is affected.

In Japanese patent publication No. 4,339,464, a method is proposed in which, when tracking of a specific person in a video image fails due to a crossing between persons, information on all persons being tracked is displayed, and the user is caused to select the specific person, thereby resuming the tracking. According to this method, although the failure of the tracking can be remedied, it is easier for the user to perform the confirmation if information only on persons who have crossed is presented. Japanese Patent Application Laid-Open Publication No. 2020-5412 discloses a method for estimating the occurrence of switching. According to this method, it is possible to estimate a person who may have crossed.

In the case in which when the same person takes a plurality of predetermined behaviors, a person is determined to be a suspicious person, based on information on tracking of the person in a video image, if switching of the information being tracked occurs, the determination of the suspicious person may fail. Specifically, when switching occurs, each behavior is recognized as being by different persons even if the same person is actually taking a plurality of predetermined behaviors, and the suspicious person is overlooked.

SUMMARY OF THE INVENTION

One object of the present invention is to provide an information processing apparatus capable of suppressing the overlooking of a suspicious person who has taken a predetermined behavior.

An information processing apparatus as one aspect of the present invention detects a predetermined behavior of a person, specifies first tracking information of a first person for which the predetermined behavior has been detected and second tracking information of a second person for which it is estimated that replacement has occurred during movement of the first person, generates third tracking information based on the first tracking information and the second tracking information, and determines whether or not the first person satisfies a predetermined condition based on a detection result of the predetermined behavior corresponding to the third tracking information.

Further features of the present invention will become apparent from the following description of exemplary embodiments with reference to the attached drawings.

BRIEF DESCRIPTION OF THE DRAWINGS

FIG. 5A and FIG. 5B are drawings that explains the information to be stored in a storage unit in the embodiments.

FIG. 6A and FIG. 6B are drawings that explain the processing of a provisional tracking information generation unit in the embodiments.

FIG. 7A and FIG. 7B are diagrams for explaining a method of recursively generating provisional tracking information.

FIG. 14A and FIG. 14B are diagrams that explain the data handled in the embodiments.

DESCRIPTION OF THE EMBODIMENTS

Figure 1:
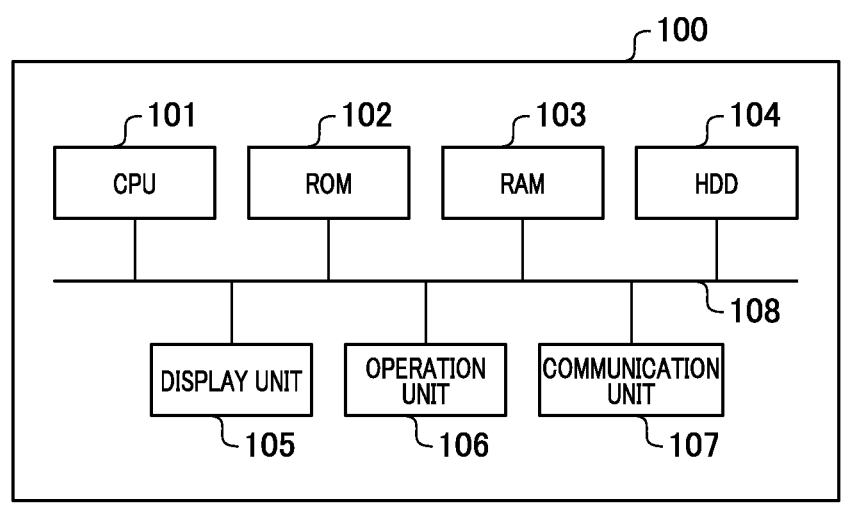
FIG. 1 is a diagram showing an information processing apparatus in the embodiments.

A detailed explanation of the embodiment will be given below with reference to the attached drawings. Note that the embodiments below are not limited to the claimed invention. Although a plurality of features are described in the embodiments, not all of these features may be essential to the invention, and the a plurality of features may be combined arbitrarily. Furthermore, in the attached drawings, the same reference numbers are given to the same or similar configurations, and redundant explanations thereof will be omitted.

In the first embodiment, a shoplifter in the video image is detected as a suspicious person by using video images captured by image capturing apparatus such as surveillance cameras installed in a shop. In general, it is known that shoplifters behave differently from a normal customer when they shoplift. For example, shoplifters look around to see if anyone is watching them, pick up an item and the like displayed on a shelf, and then put the item in a bag or the like without returning the item to the shelf. Since shoplifters take such a characteristic behavior, and if one person takes a plurality of predetermined behaviors, it can be determined that the person may be a suspicious person. In the first embodiment, the behaviors of the persons being tracked are checked, and if there is a person who performs two behaviors of picking up an item on a shelf and putting the item in a bag or the like, in that order, the person is determined to be a suspicious person.

In the first embodiment, behavior analysis is performed on information on the tracking of a person based on video images captured by an image capturing apparatus, for example, a surveillance camera installed in a store, and the determination whether or not the person in the video image is a suspicious person is performed based on the analysis result. In a information processing apparatus 100 in the first embodiment, if at least one suspicious behavior is detected from the information on the tracking of a person in the video image, the possibility that other predetermined behaviors could not be detected from the tracking information due to switching is suspected. Then, in a case where a decisive behavior as a suspicious person is detected, for example, in a case where a behavior of putting an item in one's own bag or the like is detected, whether or not other tracking information which may have been switched with the tracking information in the past are present is estimated.

If, as the result of the estimation, tracking information that may have been switched is found, provisional tracking information in which correct tracking information is estimated (provisional tracking information) is generated under the assumption that switching has occurred. Then, when an behavior analysis is performed on the provisional tracking information and it is found that a person corresponding to the provisional tracking information has taken the behavior of picking up an item on the shelf before putting the item in a bag or the like, it is determined that the person corresponding to the provisional tracking information may be a suspicious person. Thus, the information processing apparatus 100 in the first embodiment performs the above-described provisional processing to enable the detection of a suspicious person who might not normally be detected if switching occurs. Hereinafter, information on the tracking of a person is simply referred to as "tracking information", and information on the tracking that is generated assuming switching is referred to as "provisional tracking information".

Next, a configuration of the information processing apparatus 100 in the first embodiment will be described with reference to FIG. 1 and FIG. 2. FIG. 1 is a hardware configuration diagram of the information processing apparatus 100 in the first embodiment. As shown in FIG. 1, the information processing unit 100 has a CPU 101, a ROM 102, a RAM 103, an HDD 104, a display unit 105, an operation unit 106, and a communication unit 107. Note that the information processing apparatus 100 in the first embodiment may be configured as an information processing system including external devices such as a camera.

The CPU 101 is a central calculation device that performs calculations and logical decisions for various processing and controls each component connected to a system bus 108. CPU is an acronym for "Central Processing Unit". The ROM 102 is a program memory and stores programs for control by the CPU 101, including various processing procedures to be described below. ROM is an acronym for "Read-Only Memory". The RAM 103 is used as the main memory of the CPU 101, and temporary storage regions such as a work area and the like. RAM is an acronym for "Random Access Memory". Note that a program memory may be realized by loading the program into the RAM 103 from an external storage device and the like connected to the information processing apparatus 100.

The HDD 104 is a hard disk for storing electronic data and programs according to the first embodiment. External storage devices may be used a device that achieves a similar role. Here, the external storage device can be realized by, for example, a media (recording medium) and an external storage drive for realizing access to the media. For example, a flexible disks (FD), a CD-ROM, a DVD, a USB memory, an MO, a flash memory, and the others are known as such media. Additionally, the external storage device may be, for example, a server device connected by a network.

The display unit (display device) 105 is, for example, a CRT display, a liquid crystal display, and the like, which is a device that outputs images to a display screen. Note that the display 105 may be an external device connected to the information processing apparatus 100 by wired or wireless connection. The operation unit 106 has a keyboard and a mouse and receives various operations performed by a user. The communication unit 107 performs bidirectional wired or wireless communication to and from other information processing devices, communication devices, external storage devices, and the like, by using known communication technologies.

Figure 2:
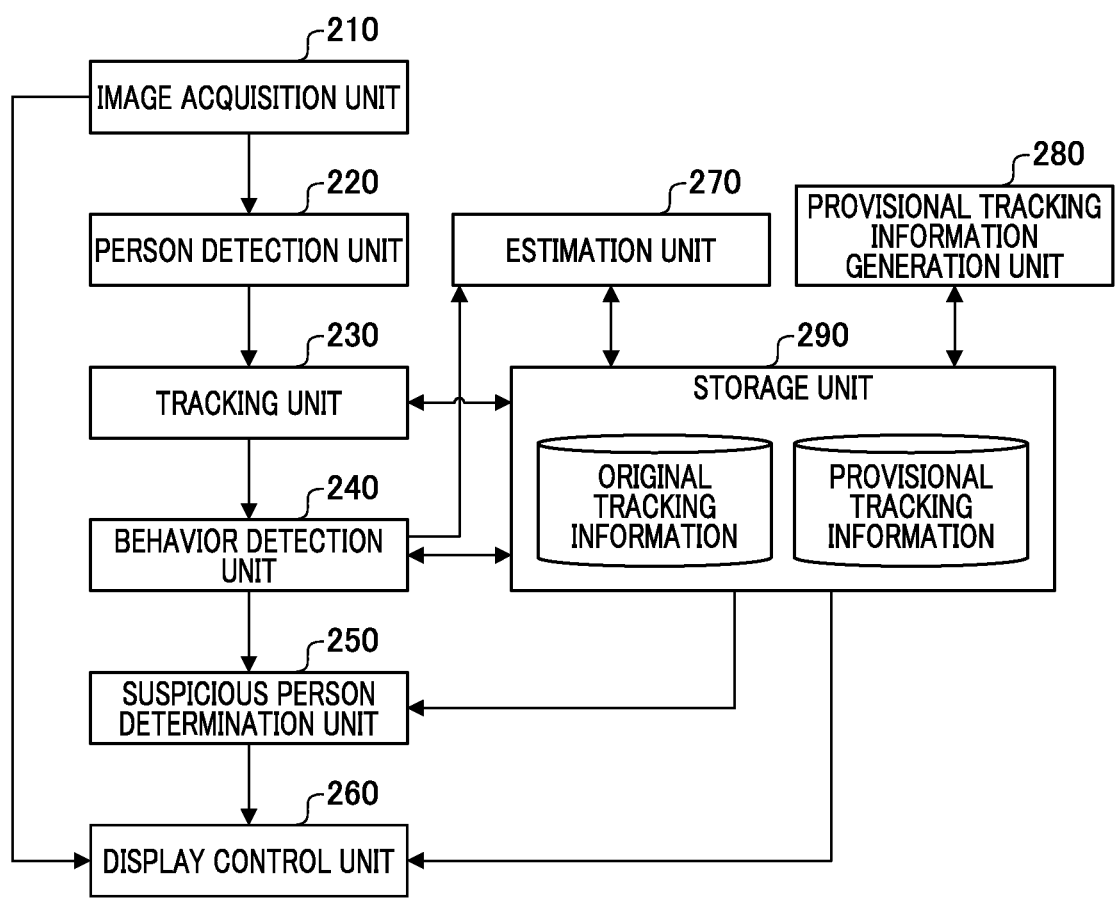
FIG. 2 is a block diagram of the functional configuration in the embodiments.

FIG. 2 is an example of a block diagram showing a functional configuration of the information processing apparatus 100. Each functional unit shown in FIG. 2 is realized by the CPU 101 deploying a program stored in the ROM 102 to the RAM 103 and executing processes according to each flowchart to be described below. The execution results of each process are then stored in the RAM 103 or the HDD 104. Additionally, for example, if hardware is configured as an alternative to software processing using the CPU 101, it is sufficient if a calculation unit and a circuit corresponding to the processing of each functional unit described here is configured.

As shown in FIG. 2, the information processing apparatus 100 in the first embodiment is configured by an image acquisition unit 210, a person detection unit 220, a tracking unit 230, a behavior detection unit 240, a suspicious person determination unit 250, a display control unit 260, an estimation unit 270, a provisional tracking information generation unit 280, and a storage unit 290.

The image acquisition unit 210 acquires video images or a series of images of processing targets that have been captured by an image capturing apparatus and the like installed in a store or other location from an external device in chronological order. Details of the processing that the image acquisition unit 210 performs will be described below.

The person detection unit 220 acquires one frame in the video image of the processing target and performs the processing for detecting a person from the frame. The video image in the first embodiment video is configured by a plurality of frames. Additionally, the person detection unit 220 performs the detection processing on each frame, acquires the position information of the person within the frame, and transmits the acquired information to the tracking unit 230. Details of the processing that the person detection unit 220 performs will be described below.

The tracking unit 230 generates tracking information for each person by performing the processing for tracking a person between frames in the video images. Details of the processing that the tracking unit 230 performs will be described below.

The behavior detection unit 240 analyzes the behavior of the person in the video image based on the tracking information generated by the tracking unit 230 and detects various behaviors of the person. The behavior detection unit 240 also transmits the detected behavior detection result to the storage unit 290. Details of the processing that the behavior detection unit 240 performs will be described below.

The suspicious person determination unit 250 performs suspicious person determination by using the behavior detection results for the tracking information and the provisional tracking information. The details of the processing that the suspicious person determination unit 250 performs will be described below.

The display control unit 260 causes a frame image imaged by the image capturing apparatus to be displayed on the screen of the display unit 105. The display control unit 260 also causes the tracking information detected for each person to be displayed on the screen of the display unit 105. Specifically, as shown in FIG. 9 to be described below, the display control unit 260 causes information on tracking information to be displayed on the frame image displayed on the screen of display unit 105. Details of the processing that the display control unit 260 performs will be described below.

The estimation unit 270 estimates tracking information that may have been switched to the tracking information from which a predetermined behavior has been detected. The details of the processing that the estimation unit 270 performs will be described below.

The provisional tracking information generation unit 280 performs the processing for generating provisional tracking information in which switching is assumed. Details of the processing that the provisional tracking information generation unit 280 performs will be described below.

The tracking information generated by the tracking unit 230 is stored in the storage unit 290. Additionally, the storage unit 290 prepares IDs for distinguishing tracking information and manages sets of the time of the frame in which the person is detected and the coordinates and size of the detection frame, for each ID. Additionally, the behavior detection result calculated by the behavior detection unit 240 based on the tracking information is stored in the storage unit 290. Additionally, in the storage unit 290, the provisional tracking information generated by the provisional tracking information generation unit 280 is stored. The storage unit 290 stores (holds) and manages the above-described various information.

Figure 3A:
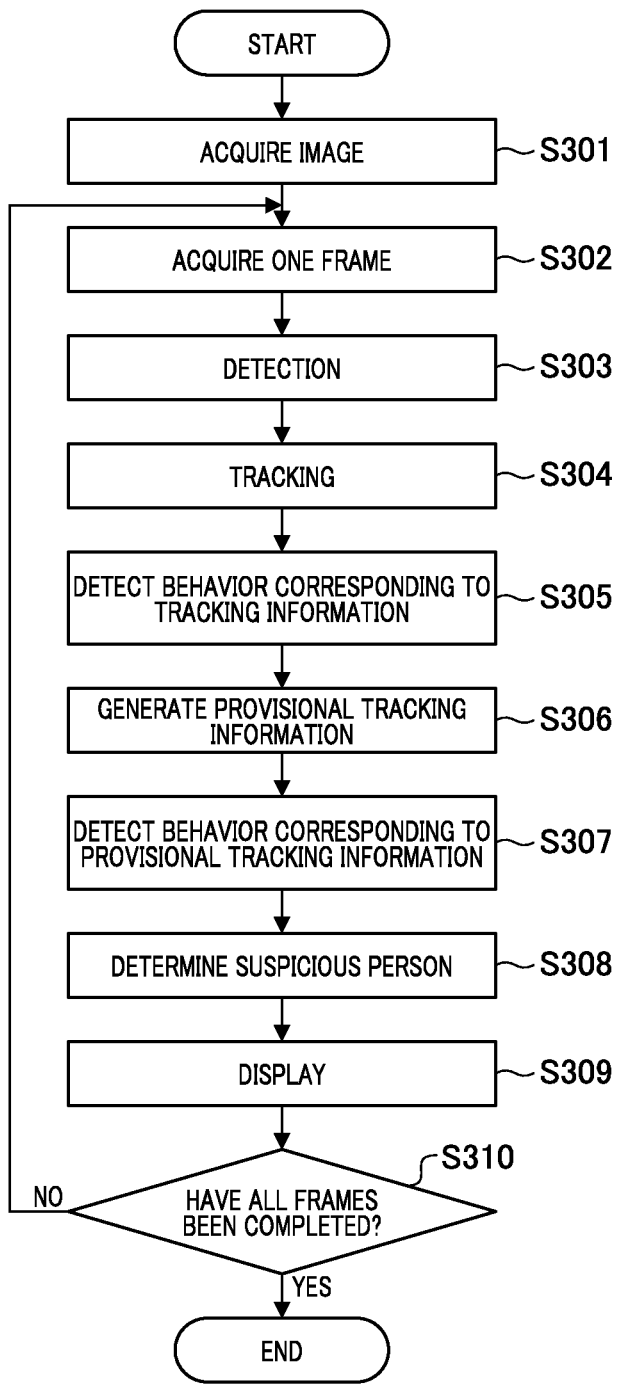
FIG. 3A and FIG. 3B are the processing flowchart in the embodiments.
Figure 3B:
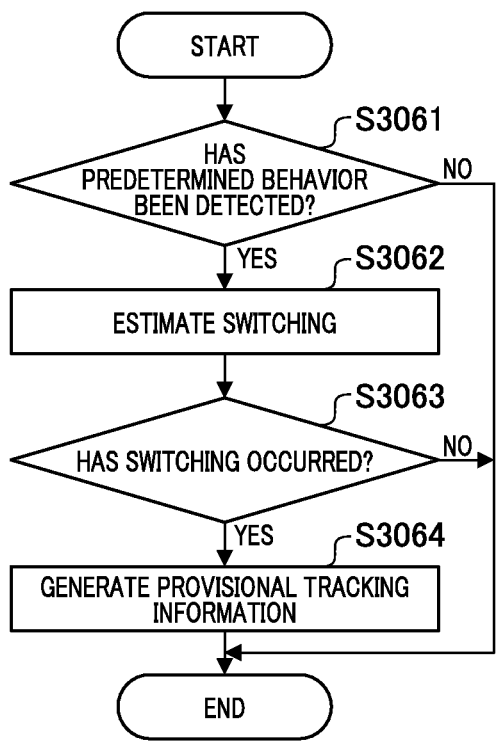

Hereinafter, processing contents of each of the above-described functional units (each means) in the first embodiment will be described in detail with reference to FIG. 3. FIG. 3 is a flowchart that explains the processing of the information processing apparatus 100 in the first embodiment. In the description below, each process (step) is denoted by adding an S at the beginning of each of the processes (steps) and the notation of the processes (steps) will be omitted. FIG. 3A is a flowchart showing the processing in the first embodiment. FIG. 3B is a flowchart showing the details of process in S306 in FIG. 3A. Note that, as described above, each operation (process) shown in the flowchart in FIG. 3 is controlled by the CPU 101 executing a computer program.

First, in S301, the image acquisition unit 210 acquires the video image or a series of images of the processing target from an external device in chronological order. Although the external device that acquires images is an image capturing apparatus, for example, a camera and a surveillance camera, it is not limited to a camera or surveillance camera and may be stored in devices such as a server or in storage medium, for example, external memory. Additionally, the external device may incorporate a camera or a monitoring camera, or may acquire an image from a camera or a monitoring camera at a remote location via a network such as an IP network.

In the first embodiment, although the image acquisition unit 210 acquires video images captured by a surveillance camera installed in a store, the installation location of the surveillance camera is not limited to this, the camera may be installed in facilities or structures other than the store, or outdoors. An example of video images handled in the first embodiment will be described below with reference to FIG. 4.

Figure 4:
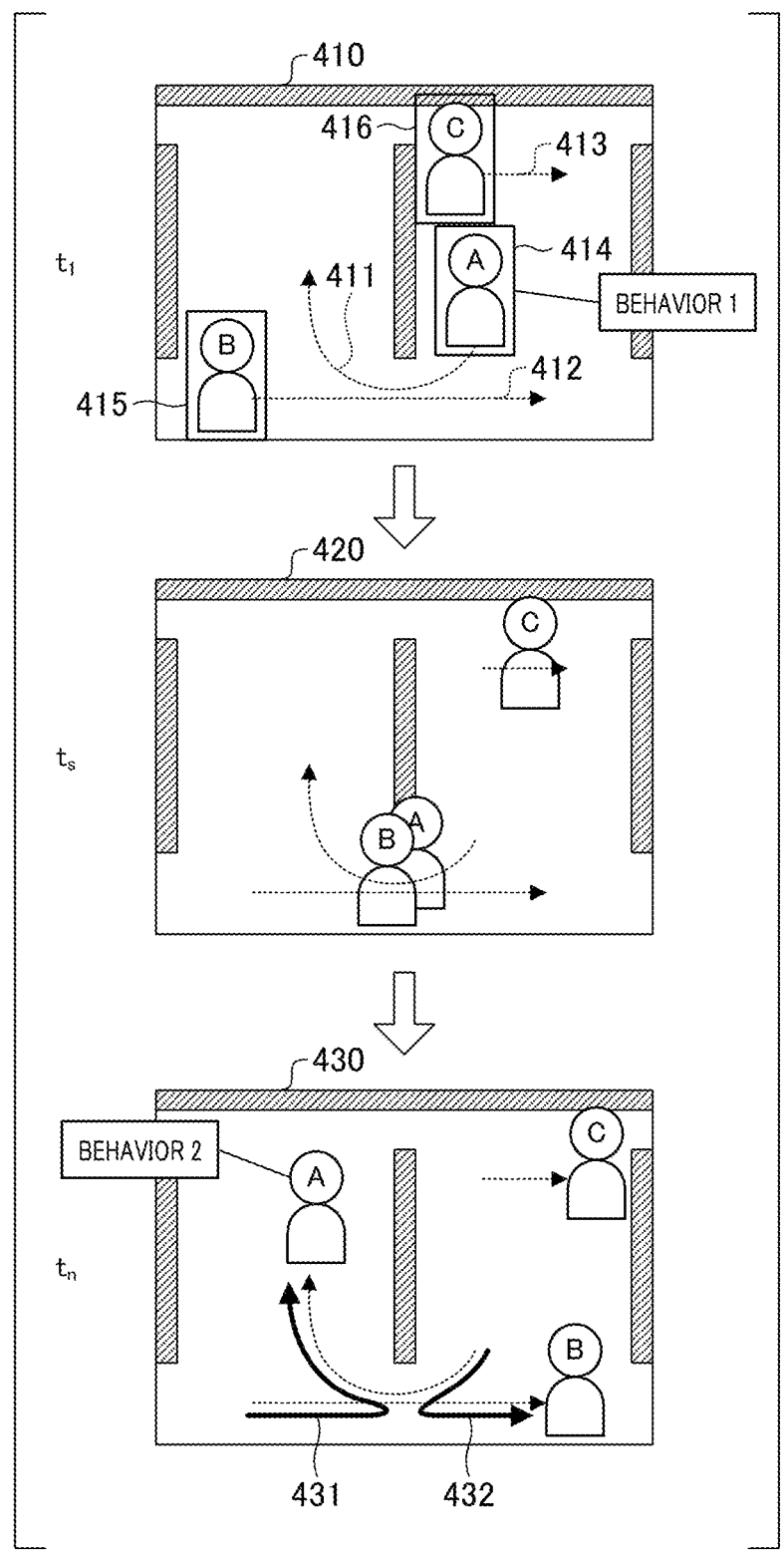
FIG. 4 is a diagram explaining the video images handled in the embodiments.

FIG. 4 illustrates an example of video images handled in the first embodiment. It is assumed that A frame (frame image) 410 is a frame at time $t_1$ of the video image of the processing target. It is assumed that A frame 420 is a frame at time t of the video image of the processing target. It is assumed that A frame 430 is a frame at time $t_n$ of the video image of the processing target.

The portions marked by diagonal lines (shaded portion) in each frame represent shelves that are located in the store. Persons A, B and C appear in the video image. It is assumed that a dotted arrow 411 is the line of motion that the person A actually moves from time $t_1$ to time $t_n$. It is assumed that a dotted arrow 412 is the line of motion that the person B actually moves from time $t_1$ to time $t_n$. It is assumed that a dotted arrow 413 is the line of motion that the person C actually moves from time $t_1$ to time $t_n$. In the drawing, the wording (display) of "Behavior 1" and "Behavior 2" indicate that the person has taken predetermined behaviors.

In the first embodiment, as shown in FIG. 4, it is assumed that person A took the behavior of picking up an item on the shelf (Behavior 1) at time $t_1$ in the frame 410. Additionally, it is assumed that person A took the behavior of putting the item on the shelf in a bag or the like (Behavior 2) at time $t_n$ in the frame 430. Additionally, it is assumed that person A and person B crossed at time $t_s$. In the information processing apparatus 100 in the first embodiment, it is possible to suppress the case of overlooking the person A who is estimated to be a suspicious person due to switching of the tracking information of the persons A and B.

The description will return to FIG. 3, next, in S302, the person detection unit 220 acquires one frame in the video image of the processing target from the image acquisition unit 210. Next, in S303, the person detection unit 220 performs the processing for detecting the person from the frame. The person detection unit 220 acquires frames from the video image, applies detection processing to each frame, and acquires position information of a person in the frame. After acquiring the position information of all persons within the frame, the person detection unit 220 transmits (passes) the information to the tracking unit 230.

In the first embodiment, it is assumed that detection is performed by a model in which learning for detecting a person from the frame has been performed in advance. For example, learning of many learning data configured by a pair of an image in which a person is captured and a correct image showing the position of the person in the image is performed, a frame is input to the model, and consequently, output of information on the position of the person within the frame becomes possible.

In the first embodiment, it is assumed that, as the position information obtained by the person detection unit 220, detection frame information indicating an image range in which each person exists in the frame by a rectangle is acquired. It is assumed that the detection frame information is the upper-left coordinates and size of the detection frame within the frame. Reference numeral 414 that has a rectangular shape displayed in the frame 410 shown in FIG. 4 is an image of the detection frame (detection region) of the person A. Additionally, reference numeral 415 is an image of the detection frame (detection region) of the person B. Additionally, reference numeral 416 is an image of the detection frame (detection region) of the person C. Note that as for the processes succeeding S304 to be explained below, processing at the point in time when person detection is completed with respect to the frame at time $t_n$ in S303 will be explained, for simplification of explanation.

Next, in S304, the tracking unit 230 performs the processing for tracking the person in the video image (tracking process). In the tracking processing, a result of detecting each person in each frame is assigned to tracking information different for each person, thereby generating the tracking information or updating the tracking information. In the first embodiment, the tracking unit 230 receives information on the detection frames from the person detection unit 220 and assigns the information on each detection frame in the current frame to the tracking information in the previous frames. When there is a high possibility that the person in the detection frame within the frame is a person that is present in the previous frame, the information on the detection frame in the current frame is added to the tracking information of the same person, and when it is taken into considered that a new person has appeared, new tracking information is generated.

The tracking information is information in which position information such as a detection frame for each frame of a person being tracked and an image feature in the detection frame are bundled by the number of frames in which the person is detected. The tracking unit 230 uses the position information and the image feature set in the tracking information for the assignment processing to be described below. In the first embodiment, the tracking information generated by the tracking unit 230 is managed by being transmitted to the storage unit 290 and being stored in the storage unit 290.

FIG. 5 is an image diagram showing an example of tracking information that the storage unit 290 manages. FIG. 5A is a diagram showing an example of a database of the tracking information that the storage unit 290 manages. FIG. 5B is an example of behavior detection results that the storage unit 290 manages. In the example as shown in FIG. 5, the storage unit 290 prepares IDs for distinguishing the tracking information and manages sets of the time of the frame in which the person was detected and the coordinates and size of the detection frame, for each ID. For example, a dotted line region 511 shown in FIG. 5 corresponds to the detection frame 414 of the person A at the time $t_1$ in the frame 410, and indicates the coordinates of the detection frame 414 at this time. Hereinafter, information for one frame of one person associated with the tracking information, such as the dotted line region 511, will be referred to as a "tracking element".

The tracking unit 230 performs the assignment processing using the position information or the image feature of the detection frame. Specifically, the detection frame of each person detected from the current frame and each detection frame of the previous frame are used to collate the positions and image features of the persons in the frames, and the information on the current frame is added to the tracking information having the highest similarity to the immediately preceding state. For example, when the position is used, the center position of the detection frame can be used. Additionally, when image features are used, feature amounts that are acquired by applying color information, texture information, convolutional neural networks (CNN), and the like in the detection region of the frame to the image region of the detection region can be used.

In the results of tracking in the first embodiment, it is assumed that switching of tracking information occurs at time $t_s$ when the person A and the person B cross. Actually, although the person A moves as shown by the dotted arrow 411 in FIG. 4, and person B moves as shown by the arrow 412 in FIG. 4, here, it is assumed that erroneous tracking information is obtained as shown by a bold arrow 431 and a bold arrow 432.

Next, in S305, the behavior detection unit 240 analyzes the behavior of the person in the video image based on the tracking information generated by the tracking unit 230 in S304 and detects the behavior of the person (first detection process). In detecting this behavior, the behavior detection unit 240 reads the tracking information from the storage unit 290, detects a plurality of behaviors for each of the tracking information, and outputs each of detected behaviors as a behavior detection result. Subsequently, the behavior detection unit 240 acquires information on the presence or absence of each behavior. In the first embodiment, as a behavior detection method, models are prepared in advance for each predetermined behavior, and a plurality of models are applied to each tracking information. Here, it is assumed that a model that detects the behavior of picking up an item on a shelf and a model that detects the behavior of putting an item in, for example, a bag or the like are used. Note that an item (object) on the shelf may include objects such as exhibits and samples in addition to the item. Further, the behavior of putting an item in a bag or the like is not limited to the case of putting an item in a bag, but may include the case of putting an item in a purse, a sack, a pocket, or clothes.

In the first embodiment, the behavior detection result obtained by a calculation by the behavior detection unit 240 based on the tracking information is sent to the storage unit 290 and managed by being stored in the storage unit 290. In the example table as shown in FIG. 5B, the time of the frame in which the behavior was detected, the ID of the tracking information, and the type of behavior are stored as a set, using the behavior information ID as a key. For example, a dotted line region 521 indicates that, at time $t_1$, the behavior of picking up the item on the shelf has been detected from the tracking information with the tracking ID "1". A dotted line region 522 indicates that at time $t_n$, the behavior of putting the item in, for example, a bag or the like has been detected from the tracking information with the tracking ID "2". Both behaviors are actually behaviors by the person A, and as explained in the above description, these behaviors are detected based on a different piece of tracking information due to the occurrence of switching.

Next, in S306, the provisional tracking information generation unit 280 performs the processing for generating provisional tracking information in which switching is assumed. The process in S306 will be described in detail below with reference to the processing flowchart in FIG. 3B.

First, in S3061, whether or not there was tracking information for which a predetermined behavior has been detected as a result of the processing of the behavior detection unit 240 in step S305 is determined. If, as a result of the determination, there is tracking information in which a predetermined behavior has been detected, the process proceeds to S3062. In contrast, if there is no tracking information in which the predetermined behavior has been detected, the process as shown in FIG. 3B ends and the process proceeds to S307. In the present embodiment, the presence or absence of tracking information in which the behavior of putting an item in, for example, a bag or the like has been detected is confirmed by referring to the result of the behavior detection managed by the storage unit 290. Note that, as a predetermined behavior, it is assumed that, for example, the behavior of putting the an item in, for example, a bag or the like is set, based on the tracking information corresponding to the bold arrow 431 in the frame 430 shown in FIG. 4. In that case, when it is confirmed that the behavior of putting the item in, for example, a bag or the like has been detected, it is determined that the predetermined behavior has been detected. Note that the predetermined behaviors can be set arbitrarily.

Next, in S3062, the estimation unit 270 estimates tracking information that may have been switched with the tracking information in which the predetermined behavior has been detected (estimation process). In the first embodiment, tracking information that may have been switched in the past on a path of tracking information in which the behavior of putting an item in a bag or the like has been detected is estimated. Hereinafter, tracking information of a person whose predetermined behavior has been detected (first person) is referred to as attention tracking information (first tracking information), for distinction. Furthermore, tracking information obtained as a result of estimating the tracking information of a person who may have been switched (exchanged) to the person whose predetermined behavior has been detected (second person) will be described as "cross tracking information (second tracking information)".

The estimation unit 270 performs estimation using at least one of position information and image features that are two or more tracking elements of tracking information. Note that, in the first embodiment, the information on the detection frame is used as position information. Estimation (estimation processing) that the estimation unit 270 performs is performed on other tracking information that is present at the time of appearance of a person corresponding to the attention tracking information. Regarding the estimation, although, in the first embodiment, the estimation is performed by a method based on the positional relation of the detection frame, the estimation method is not limited to the method based on the positional relation of the detection frame, and estimation may be performed by other methods.

For performing the estimation, first, in the frame at each time when the person tracked by the attention tracking information appears, the positional relation between the persons corresponding to the attention tracking information and the other tracking information is calculated. Specifically, a distance between the center positions of the detection frames of the attention tracking information and other tracking information at each time is confirmed. Then, the tracking information in which the distance is less than a predetermined threshold is estimated to be tracking information that may have been switched with the attention tracking information (cross tracking information). Note that the threshold in this case can be set arbitrarily.

Next, in S3063, as a result of the estimation performed by the estimation unit 270, it is determined whether or not tracking information (cross tracking information) that may have been switched with the attention tracking information has been detected (found). As a result of the determination, when tracking information that may have been switched with the attention tracking information is detected, the process proceeds to S3064. In contrast, if tracking information that may have been switched with the attention tracking information is not detected, the process shown in FIG. 3B ends and the process proceeds to step S307.

Next, in S3064, the provisional tracking information generation unit 280 generates provisional tracking information (third tracking information) using the attention tracking information and the cross tracking information acquired from the storage unit 290 (generation step). In the first embodiment, the provisional tracking information generation unit 280 generates provisional tracking information by a method based on the switching time. In this method, since it is necessary to estimate the switching time at the time of processing of the estimation unit 270, the switching time is set (determined) in advance before the processing of the estimation unit 270. The provisional tracking information generation unit 280 generates provisional tracking information by dividing the attention tracking information and the cross tracking information based on the switching time and rearranging a part of the tracking elements.

Note that, in the first embodiment, the switching time is determined based on the positional relation between the detection frames of the attention tracking information and the cross tracking information at each time. Specifically, the distance between the centers of the detection frames of the target tracking information and the cross tracking information is obtained, and the time at which the distance becomes the minimum value is set as the switching time.

FIG. 6 is a diagram that explains the processing of the provisional tracking information generation unit 280 in the first embodiment. FIG. 6A is a diagram illustrating an example of processing in which the provisional tracking information generation unit 280 generates provisional tracking information based on the attention tracking information and the cross tracking information. FIG. 6B is a diagram illustrating an example of generating provisional tracking information by a method using clustering.

Reference numeral 610 having a rectangular shape indicates the attention tracking information. Additionally, reference numeral 620 having a rectangular shape indicates cross tracking information. Additionally, reference numeral 630 having a rectangular shape indicates provisional tracking information. The attention tracking information 610 and the cross tracking information 620 respectively correspond to the paths of the bold arrow 431 and the bold arrow 432 in the frame 430 in FIG. 4. It is assumed that a circle in FIG. 6 indicates one tracking element and tracking elements of the corresponding times are arranged according to time t. The text A and text B described in the circles indicate the persons who are actually correct and correspond to the persons in the frame in FIG. 4.

In the first embodiment, it is assumed that a predetermined behavior is detected at time $t_n$ from the target tracking information. Based on this, a set 611 of tracking elements in the section from the time $t_s$ to the time $t_n$, which is the switching time of the attention tracking information 610 in FIG. 6A, is used as it is in the section as indicated by reference numeral 631 when provisional tracking information is generated. Then, the attention tracking information 610 and the cross tracking information 620 are divided at time $t_s$ that is the switching time. Next, the provisional tracking information 630 is generated by combining information before the time $t_s$ that is the switching time of the attention tracking information 610 and the tracking element after the time $t_s$ that is the switching time of the cross-tracking information 620. By the above method, provisional tracking information can be generated based on the switching time. The generated provisional tracking information is stored in the storage unit 290.

Note that, in the first embodiment, the storage unit 290 manages tracking information and provisional tracking information separately. Separate management of the tracking information and the provisional tracking information leads to an advantage that processing can be performed without deleting or overwriting the original tracking information. By performing the above-described processes from S3061 to S3064, provisional tracking information can be generated.

Next, in S307, the behavior detection unit 240 reads out the provisional tracking information from the storage unit 290 and performs behavior detection on the provisional tracking information (second detection process). The processing method in the behavior detection unit 240 will be omitted because it is the same as the method that has been explained in S305. Note that, in the first embodiment, it is assumed that a behavior of picking up an item on a shelf is detected (first behavior) at time $t_1$ and a behavior of putting the item in a bag or the like is detected (second behavior) at time $t_n$ from the provisional tracking information by the processing of the behavior detection unit 240.

Next, in S308, the suspicious person determination unit 250 performs the determination of a suspicious person by using the behavior detection result of the tracking information and the provisional tracking information (determination process). In the first embodiment, the suspicious person determination unit 250 determines whether or not a person in each tracking information also including the provisional tracking information, satisfies predetermined conditions based on the detection results of each of the tracking information and the provisional tracking information. At this time, the suspicious person determination unit 250 determines whether or not a person in each tracking information including the provisional tracking information is taking the second behavior after the first behavior. Accordingly, it is possible to find a person who satisfies the predetermined conditions from each tracking information, and determine whether or not the person in any piece of tracking information is a suspicious person. Specifically, the suspicious person determination unit 250 reads out the information of the accumulation unit 290, and determines that the person corresponding to the tracking information is the suspicious person when the behavior of picking up the commodity on the shelf (first behavior) and the behavior of putting the commodity in a bag or the like (second behavior) are sequentially detected from one piece of tracking information. This processing is preferably performed according to the number of pieces of tracking information. Note that, in the first embodiment, since the provisional tracking information satisfies this condition, it is determined that the person A corresponding to the provisional tracking information is a suspicious person.

Next, in S309, the display control unit 260 displays tracking information corresponding to the person determined to be a suspicious person on the display unit 105. In the first embodiment, the tracking information corresponding to the person A determined to be a suspicious person and the peripheral region of the person A are highlighted in the frame in which the suspicious person has been detected.

Figure 9A:
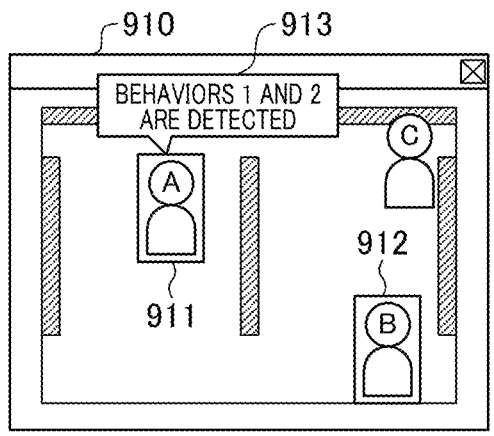
FIG. 9A to FIG. 9C are drawings that explain the processing of a display control unit in the embodiments.
Figure 9B:
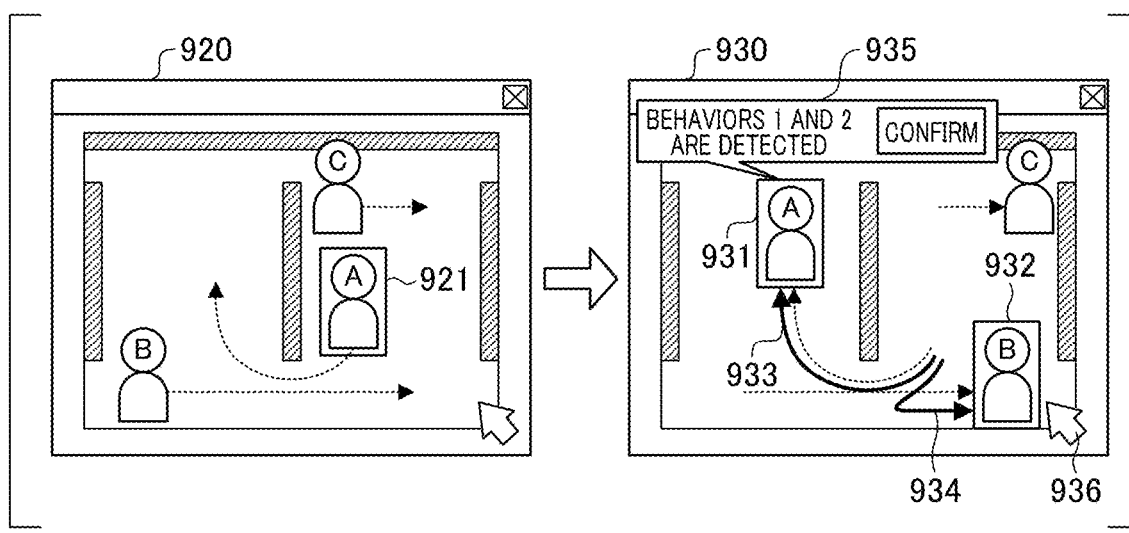
Figure 9C:
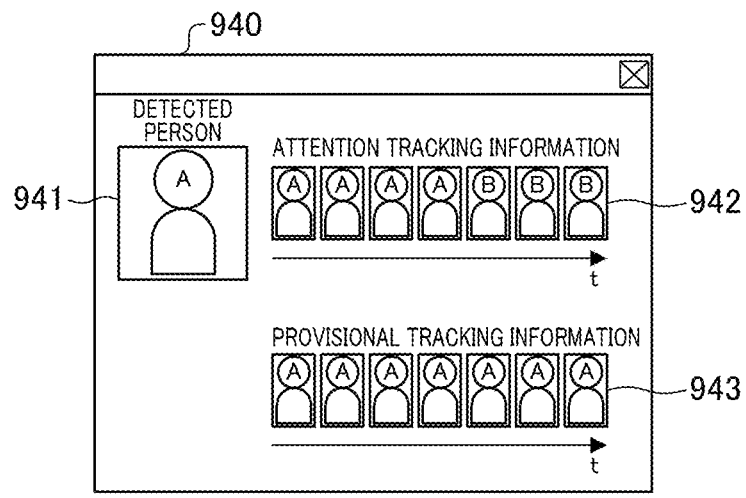

FIG. 9 is a diagram for explaining the processing of the display control unit 260, and FIG. 9A is an image in which the tracking information corresponding to the person A determined to be a suspicious person is highlighted in a frame in which a suspicious person has been detected. FIG. 9B is an image in which an behavior of looking around at time $t_1$ is detected from the tracking information of the person A in the video image, and then the highlight is performed in the subsequent frames. FIG. 9C is an image in which an image range of the tracking information related to a person determined to be a suspicious person is cut out from a frame at each time and displayed.

A window 910 shows that highlight is added to frame 430 at time $t_n$. In the window 910, a detection frame 911 of the person A is highlighted. Note that, when the detected behavior is displayed on a person determined to be a suspicious person, the user can know the cause of the determination as the suspicious person. For example, information indicating what behavior is detected is added, as shown by, for example, a balloon 913. Although "Behavior 1, behavior 2 are detected" is displayed in the drawing, the display is not limited thereto, the actual behavior may be displayed.

Note that, when the attention tracking information of the derivation source of the provisional tracking information in which the suspicious person is detected is also highlighted, it is possible to distinguish between the person A and the person B who may have performed the suspicious behavior when the switching is taken into consideration, and the person C who is not related at all. In the example in FIG. 9, a detection frame 912 of the person B corresponding to the attention tracking information is also highlighted. Note that the provisional tracking information and the target tracking information may be displayed so as to be distinguishable from each other. For example, the detection frame of the attention tracking information may be displayed by a frame with a thicker line than the detection frame of the provisional tracking information. Additionally, for example, the detection frame of the attention tracking information or the frame of the provisional tracking information may be colored so as to be distinguished from each other. Accordingly, the visibility of the user can be improved, and the user can preferentially confirm the frame of the original tracking information. Note that the detection frame of the provisional tracking information may be displayed in the same manner as above.

Next, in S310, it is determined whether or not a series of processes for determining a suspicious person has been completed for all frames. As a result of the determination, if a series of processes have been completed for all frames, the processing of the flow as shown in FIG. 3 ends. In contrast, if a series of processes has not been completed for all frames, the process returns to S302, and the processes from S302 to S310 are repeated.

According to the above method, in the first embodiment, it is possible to provide the information processing apparatus 100 capable of generating the provisional tracking information on the assumption that the switching has occurred and presenting the possibility that the suspicious person has been present on the assumption to the user. Additionally, in the information processing apparatus 100 in the first embodiment, it is possible to prevent the suspicious person from being overlooked even when the information related to the behavior of one person is divided into a plurality of pieces of tracking information by switching.

Note that, although, it has been described in the above description that each component of the information processing apparatus 100 transmits and receives information via the storage unit 290, as in the configuration shown in FIG. 1, information may be transmitted and received directly not via the storage unit 290. For example, the tracking information can be transmitted to the behavior detection unit 240 not via the storage unit 290. In that case, the same processing as described above can be performed.

Note that although, in the above description, the method for using the attention tracking information and the cross tracking information when the provisional tracking information generation unit 280 generates provisional tracking information has been explained, the method for generating the provisional tracking information is not limited thereto. For example, it is also possible to estimate tracking information that may have been switched with the provisional tracking information, and recursively generate new provisional tracking information by using the tracking information and the provisional tracking information.

An example of recursively generating new provisional tracking information will be described with reference to FIG. 7. FIG. 7 is a diagram illustrating a method for recursively generating provisional tracking information. FIG. 7A is a diagram showing tracking information that the tracking unit 230 generates. FIG. 7B is a diagram showing provisional tracking information that the provisional tracking information generation unit 280 generates.

t-axis shown in FIG. 7 represents time. Additionally, reference numerals 710, 720, and 730 each having a rectangular shape respectively represent tracking information. Additionally, reference numerals 740 and 750 each having a rectangular shape respectively represent provisional tracking information. The circle in the drawing represents one tracking element. The text in the circle in the drawing represent the person who is actually correct. Here, it is assumed that, in the tracking information 730, a behavior of putting the item in a bag or the like is detected at time $t_{a2}$. Additionally, it is assumed that the tracking information 710 and the tracking information 720 are switched at time $t_{s1}$, and the tracking information 720 and the tracking information 730 are switched at time $t_{s2}$.

First, it is assumed that the tracking information 720 (crossing tracking information) is obtained as an estimation result related to the tracking information 730 that is set as the attention tracking information by the estimation unit 270. In response to this estimation result, the provisional tracking information generation unit 280 generates provisional tracking information 740 based on the tracking information 730 and the tracking information 720. Next, the estimation unit 270 obtains the tracking information (fourth tracking information) 710 as the cross tracking information, as the result of the estimation related to the cross tracking information 720 that is a derivation source of the provisional tracking information 740. Based on this estimation result, the provisional tracking information generation unit 280 generates new provisional tracking information (fifth tracking information) 750 based on the provisional tracking information 740 and the crossing tracking information 710. In this way, when the provisional tracking information is recursively generated, even when a certain person switches with a plurality of persons while taking a behavior of picking up an item on a shelf or taking a behavior of putting an item in a bag or the like, it is possible to suppress overlooking of a suspicious person. Note that, similarly to the above description, it is desirable that, in the storage unit 290, various tracking information such as the tracking information, the provisional tracking information, and the new provisional tracking information generated as described above are separately managed.

Note that, the order of processing of the information processing apparatus 100 in the first embodiment is not limited to the order of the processing flowchart in FIG. 3. In the above description, a method has been described in which, when a person whose predetermined behavior has been detected is present, it is checked whether or not the person has performed another predetermined behavior in previous frames. In addition, with a similar configuration, when a predetermined behavior is detected, provisional tracking information can be generated in subsequent frames. For example, if there is tracking information in which a behavior of looking around is detected, detailed analysis for generating provisional tracking information in consideration of switching is performed only on the tracking information, in succeeding frames.

Figure 8:
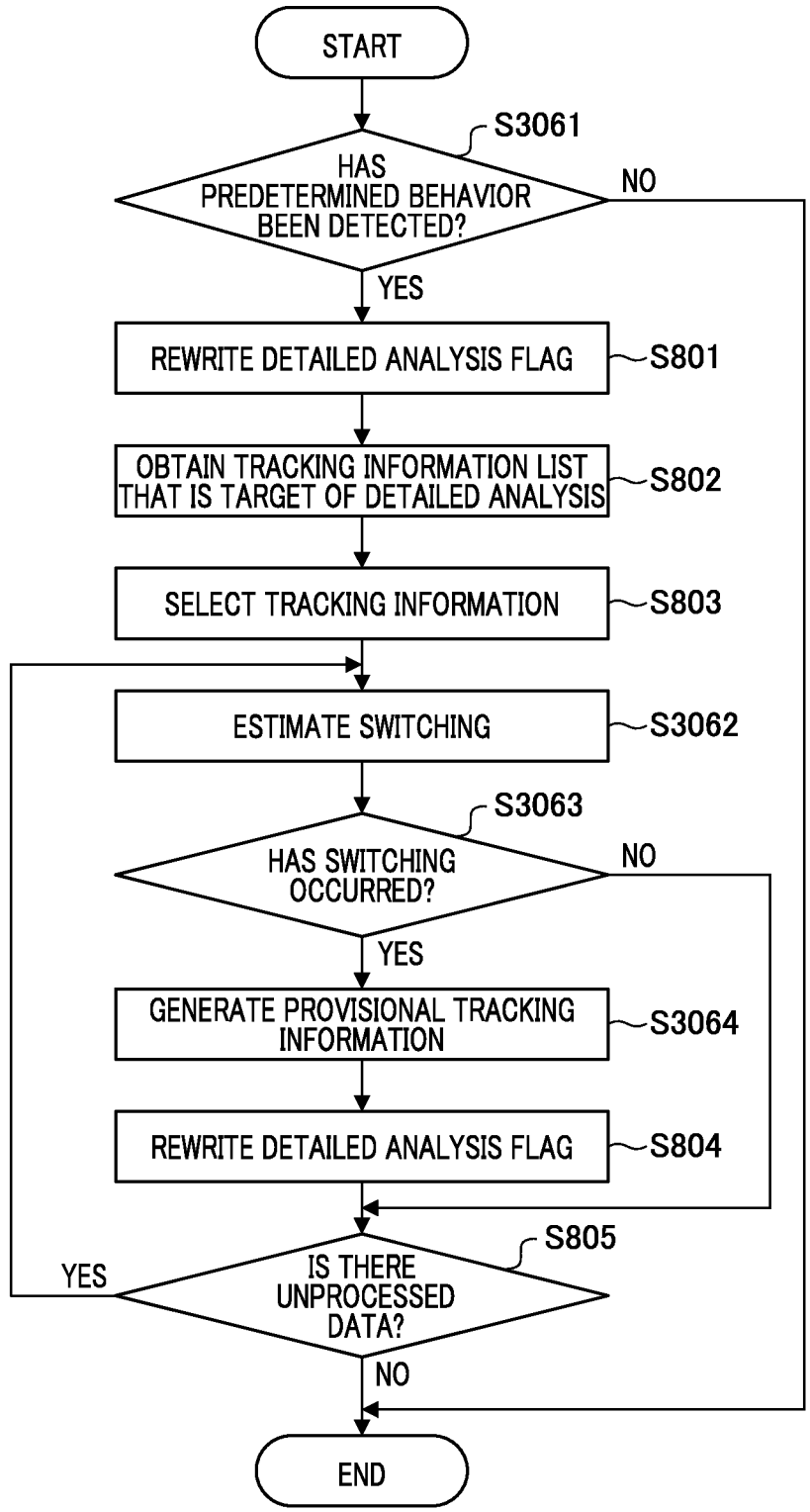
FIG. 8 is a processing flowchart showing the different patterns in the embodiments.

Hereinafter, an example of a flow of processing is shown with reference to FIG. 8. FIG. 8 is a processing flowchart that is a different pattern in the first embodiment. Note that the processes as shown in FIG. 8 correspond to S306 as shown in FIG. 3. Hence, redundant explanations in S3061 to S3064 shown in FIG. 3B will be omitted.

In the processes shown in FIG. 8, a flag is assigned to each piece of tracking information as to whether or not it is a target of detailed analysis, which is managed by the storage unit 290, thereby making the processing easier. A value of the flag can be switched ON and OFF, and when the value is switched to ON, the processing of the estimation unit 270 and the provisional tracking information generation unit 280 are performed with respect to the tracking information. Note that, at the start of processing, the value of the flag for all tracking information is set to OFF.

Note that processes from S301 to S305 are simply omitted and are assumed to have been completed. First, in S3061, it is determined whether or not a third behavior has been detected from the tracking information. As a result of the determination, when the third behavior is detected, the process proceeds to S801. In contrast, if the third behavior is not detected, the processes as shown in FIG. 8 ends, and the process proceeds to S307 and the process continues. Here, it is assumed that the third behavior is looking around. Note that the explanation will be given here assuming that the corresponding tracking information has been found.

Next, in S801, the detailed analysis flag of the corresponding tracking information (attention tracking information) is set to ON, and the list managed by the storage unit 290 is rewritten with this result. Next, in S802, the estimation unit 270 acquires a list of tracking information in which the flag is ON from the storage unit 290. Next, in S803, a piece of tracking information is selected from the list acquired in S802. Next, in S3062, the estimation unit 270 estimates the tracking information selected in S803 and the tracking information that may have been switched in the current frame (cross tracking information).

Next, in S3063, it is determined whether or not the tracking information that may have been switched has been detected. As a result of the determination, when tracking information that may have been switched is detected, the process proceeds to S3064. In contrast, if the tracking information that may have been switched is not detected, the process proceeds to S805.

Next, in S3064, the provisional tracking information generation unit 280 generates provisional tracking information based on the estimation result. Next, in S804, the flag of the provisional tracking information generated in S3064 is set to ON, and the list managed by the storage unit 290 is rewritten with this result.

Next, in S805, it is determined whether or not unprocessed data is present from among the tracking information or the provisional tracking information in the list managed by the storage unit 290. As a result of the determination, when unprocessed data is present, the process returns to S3062 and the same processing is repeated. In contrast, if unprocessed data is not present, the process as shown in FIG. 8 ends, and the process proceeds to S307 and the process continues. Note that, similarly to the above description, it is desirable that the tracking information and the provisional tracking information are managed separately in the storage unit 290, and, for example, the lists of the tracking information and list of the provisional tracking information are managed by different tables. Note that since the processes succeeding S307 are the same as those in FIG. 3, the explanation will be omitted. However, the processing of behavior analysis, determination of a suspicious person, and display are performed in order by the method as described above.

By rewriting the flags of the attention tracking information and the provisional tracking information to ON in this way while repeating the processes from S301 to S310, it is possible to check in detail whether or not a person who has taken a predetermined behavior will take another behavior in subsequent frames. Even if the processes are performed in the above order, the effect that is similar to the first embodiment can be obtained.

Note that, although, in the processing flowchart of FIG. 3, the processing of the behavior detection unit 240 is performed twice in S305 and S307, the process in S307 may be omitted. Specifically, the provisional tracking information and a predetermined behavior can be associated based on the tracking information and the behavior detection result stored in the storage unit 290. And, for example, in the case of FIG. 5B that is an example of the behavior detection result, it can be seen from the cross tracking information 620 (tracking IDs: 1) used during generation of the provisional tracking information 630 that a predetermined behavior has been detected at time $t_1$ as in the dotted line region 521. Therefore, if, during the generation processing of the provisional tracking information generation unit 280, a record is left in the storage unit 290 as to which tracking element of tracking information the time at which each behavior is detected corresponds to, the behavior detected in the cross tracking information and the provisional tracking information can be associated. According to this method, the processing of the behavior detection unit 240 can be reduced (processing cost can be reduced).

Note that although the method in which, in the estimation unit 270, the distance between a plurality of pieces of tracking information at the same time is used, which is a method based on the positional relation of the detection frames, has been explained as above, the method based on the positional relation is not limited thereto. Two other methods will be described below.

As a first method, there is a method of using overlapping of detection frames of tracking information. Specifically, if there is a moment when the detection frames of the attention tracking information and other tracking information overlap, it is estimated that switching has occurred. The presence or absence of overlap is determined by comparing the size relations between the by coordinates of the end points of one rectangle and the by coordinates of the end points of the other rectangle, with respect to the two detection frames. Although, in the above-described method using the distance, since the size of the person changes between the front side and the back side of the screen, it may be difficult to set an appropriate distance, in this method, it is not necessary to consider this point. Note that, although, in the above description, a method based on the distance between the detection frames, which is a method for estimating the switching time, has been described, the switching time can also be determined based on the overlap. In this case, the overlap of the detection frames of the two pieces of tracking information at each time is checked, and for example, the middle time between the time when the overlap occurs and the time when the overlap disappears is set as the switching time.

As a second method, there is a method in which an image range in which switching is likely to occur in a video image is set in advance, and estimation is performed based on the range and tracking information. In this method, it is necessary to adopt a configuration in which information is transmitted from the operation unit 106 that receives user operations to the estimation unit 270. Specifically, since the rear of the shelf is a blind spot on the video image and the moment when the persons pass each other cannot be confirmed, the user is caused to set the blind spot range in advance via the operation unit 106. Then, if there is tracking information of a person who passes through the blind spot range at the same time as the person corresponding to the attention tracking information, it is estimated that the tracking information is switched with the attention tracking information. According to this method, switching between persons who have disappeared from the frame due to a blind spot can also be estimated.

Note that, although, in the above description, a method based on the positional relation of the detection frames, which is an estimation method performed by the estimation unit 270, has been described, in addition, there are other methods based on the image features of the tracking information. In the method based on the positional relation, it is determined that the switching has occurred only when the persons pass close to each other in the frame. However, in the method based on the image features, since the switching is estimated based on the information of the image, excessive erroneous estimation can be suppressed. Methods based on the image features include a method using the similarity of image features and a method using face authentication.

Two methods using the similarity of image features will be described below. The first method is a method using clustering. Clustering is performed on image features in the attention tracking information and other tracking information. Clustering is a method of dividing data into clusters based on distances between data in a feature space. Here, it is assumed that, in the case of switching, since a person is replaced during tracking, the image feature changes before and after the switching and is classified into another cluster. Then, when the image feature associated with the attention tracking information is classified into a plurality of clusters, it is estimated that switching has occurred, and other tracking information in the cluster including the attention tracking information is estimated as switched tracking information.

The second method is a method using similarity. In this method, the degree of similarity of image features included in the attention tracking information and other tracking information is calculated, and if there is other tracking information having a high similarity to the attention tracking information, it is determined that there is a possibility of switching. Specifically, the image feature at the time when the predetermined behavior is detected is extracted from among the image features in the attention tracking information, and the degree of similarity between the image feature and each image feature in the other tracking information is calculated. Thereafter, for example, if there is at least one piece of tracking information whose degree of similarity is higher than a predetermined value, the tracking information switched to the attention tracking information is estimated.

Next, a method using face authentication will be described. In this method, for example, the estimation unit 270 performs face detection in the image range of the person associated with the tracking information, and applies a face authentication model prepared in advance to the image range of the detected face. The face authentication model is a model that outputs a different ID for each person when an image including a face is input. The estimation unit 270 applies the face authentication model to the detection frame of the face of each piece of tracking information, and when the same ID as the face authentication result of the person from which the predetermined behavior has been detected is obtained from another piece of tracking information, the estimation unit 270 estimates that switching with the tracking information has been performed.

The above is the method based on the image features. Note that the method using the degree of similarity can also be applied to a case where no face is captured. In contrast, the method using face authentication is based on information that is certainly different for each person, so that the estimation accuracy can be increased as compared with other methods. The estimation performed by the estimation unit 270 may be performed by combining a plurality of estimation methods as described above. Note that estimation accuracy can be improved by performing estimation by combining a plurality of estimation methods.

Although, in the above description, the method based on the switching time has been described as the processing of the provisional tracking information generation unit 280, the method for generating the provisional tracking information is not limited thereto. For example, in a scene in which persons overlap with each other for a long time, tracking information may be switched a plurality of times, and in such a scene, it is difficult to determine a switching time. However, the following method based on similarity or a method based on face authentication can cope with this difficulty.

First, a method based on similarity will be described. In the method based on similarity, provisional tracking information is generated by using the result of performing statistical processing on the image features of the attention tracking information and the cross tracking information at each time. Hereinafter, a method using clustering and a method based on similarity will be described.

In the method using clustering, clustering is applied to the image features of the attention tracking information and the cross tracking information, and provisional tracking information is generated based on which cluster each image feature amount is classified into. An example is shown in FIG. 6B. Reference numeral 640 having a rectangular shape represents attention tracking information. Additionally, reference numeral 650 having a rectangular shape represents attention tracking information. Additionally, reference numeral 660, which has a rectangular shape, represents provisional tracking information generated from these. It is assumed that persons cross in the section between time $t_{s1}$ and time $t_{s2}$, and a plurality of times of switching occurs in this section. Clustering is performed on the image features of the tracking information 640 and the tracking information 650, and the tracking elements are rearranged based on the cluster to which each image feature belongs, thereby generating provisional tracking information 660.

In the method using the degree of similarity, provisional tracking information is generated by using the degree of similarity of the image features between the attention tracking information and the cross tracking information. Specifically, first, the degree of similarity of the image feature of the attention tracking information at each time other than time $T_n$ corresponding to the image feature of the attention tracking information in which the predetermined behavior has been detected at the time $t_n$, and the degree of similarity of the image feature of the cross-tracking information are respectively calculated. Then, tracking elements having higher similarity at each time are selected and combined to generate provisional tracking information.

Next, a method based on face recognition will be described. First, face recognition is performed for each tracking element by using the attention tracking information and the cross-tracking information. Then, the provisional tracking information is generated by selecting and combining tracking elements for which the same result as the face authentication result of the attention tracking information at time $t_n$ has been obtained, from among the tracking elements of the attention tracking information and the cross-tracking information at each time. Although it is difficult to apply this method to a scene in which a person faces backward, it is possible to increase the accuracy of setting the tracking element of the same person in the provisional tracking information in a scene in which the person faces the front or in a direction close to the front.

Note that it is also possible to assume a case in which there is a tracking element for which it is not possible to determine which tracking information it belongs to when switching is assumed, among the data associated with the attention tracking information and the cross tracking information. In that case, provisional tracking information may be generated without including the tracking element. It is possible to increase the accuracy of setting the information regarding the same person in the provisional tracking information by excluding a tracking element that cannot be determined.

Note that although, it has been described above that the display control unit 260 highlights a frame in which a person determined as a suspicious person by the suspicious person determination unit 250 is present, the display timing is not limited thereto. It is also possible to highlight the attention tracking information and the provisional tracking information after at least one behavior is detected. Here, as in the process flowchart shown in FIG. 8, an example of the processing of detecting the behavior of looking around at the time $t_1$ from the tracking information with respect to the person A in the video image shown in FIG. 4 and then performing highlight in the succeeding frames will be described with reference to FIG. 9B.

A window 920 shown in FIG. 9B is a drawing image of the frame at the time $t_1$ shown in FIG. 4. Additionally, a window 930 is a drawing image of the frame at the time $t_n$ shown in FIG. 4. Here, a detection frame 921 of the tracking information corresponding to the person A is highlighted from time $t_1$ at which the behavior of the person A looking around was detected. After time $t_s$, which is the switching time, the detection frame of an attention tracking information 934 and a provisional tracking information 933 derived from this tracking information is highlighted for each frame. In the window 930, a state of highlighting a detection frame 932 and a detection frame 931 corresponding to each piece of tracking information is shown.

Note that the end timing of the highlight may be when information indicating that confirmation has been made is received from the user via the operation unit. For example, information on a person who is likely to be a suspicious person is drawn as in a balloon 935, and a confirmation button is provided around the person. The highlighting is ended when the user presses the confirmation button by a mouse pointer 936.

Note that if another behavior is not detected even when a predetermined time passes after the behavior of looking around is detected, it may be determined that the suspicious person is not present, and the highlighting may be ended. Thus, when the unnecessary information is deleted from the screen at any time, the user does not need to see the unnecessary information.

Although the method of highlighting a frame has been described above as a display method, there is also a method of cutting out and displaying an image range of tracking information regarding a person determined as a suspicious person from a frame at each time. The method will be explained with reference to FIG. 9C.

An image 941, a diagram 942, and a diagram 943 are respectively displayed on a window 940 shown in FIG. 9C. t-axis represents time. The image 941 is an image obtained by cutting out an image range of the detection frame of the tracking information on a person determined to be a suspicious person. In the diagram 942 and the diagram 943, the image ranges of the detection frames at each time respectively associated with the original tracking information and the provisional tracking information are cut out and arranged in the order of time t. In this way, when the image ranges are cut out and displayed side by side for each time t, it becomes easy for the user who is viewing the screen to confirm whether or not the same person has taken a predetermined behavior.

Note that, although, in the above description, it has been described that the storage unit 290 stores various tracking information such as the tracking information and the provisional tracking information, old information may be deleted. For example, when a predetermined period of time passes after detecting a predetermined behavior, the provisional tracking information is deleted. Deleting unnecessary data helps to prevent an increase in memory load.

Note that a storage unit may be added to the configuration of the information processing apparatus 100 shown in FIG. 2. Then, the storage unit may cut out and store at least one of the information on the section of the frame related to the tracking information or the provisional tracking information used in the suspicious person determination or the information on the video image of the section. A customer who visits a store or the like may visit the store on a random schedule, or may visit the store on a schedule that is a routine to some extent, such as on a daily basis or on a weekly basis. Therefore, even if the user cannot confirm in real time, if the user can confirm a person who is likely to be a suspicious person later, measures can be taken for the next visit of the confirmed person, or measures such as improvement of the surroundings where suspicious behavior is detected can be taken.

Note that, although the above explanation has explained the method in which, in a case in which at least one predetermined behavior is detected based on the tracking information, the processing of the provisional tracking information generation unit 280 is performed by using the tracking information in which the predetermined behavior has been detected, the timing for generating the provisional tracking information is not limited thereto. For example, the provisional tracking information generation unit 280 may always generate provisional tracking information and the storage unit 290 may hold the information, and the behavior detection unit 240 may perform behavior detection on both the provisional tracking information and the tracking information that is the derivation source in each frame. According to this method, since behaviors that cannot be detected from the tracking information that the tracking unit 230 generates may be detected from the provisional tracking information, it is possible to further prevent the suspicious person from being overlooked.

The information processing apparatus 100 in the second embodiment determines a suspicious person in consideration of the possibility that switching has occurred during tracking, while performing the processing referred to as tracking (tracking processing) of collating tracking information with each other and associating them. The tracking processing here refers to the processing in which tracking information that is considered to be of the same person is associated with the same ID based on information such as image features of a plurality of pieces of tracking information.

Hereinafter, the result of associating the tracking information by tracking will be described as tracking information. When a person in the video image enters a blind spot on the screen, for example, behind a shelf, and disappears for a long time and then reappears, the tracking information is interrupted. However, the tracking information before and after the person disappears can be associated by the tracking processing. Thus, if tracking processing is performed, it is possible to perform suspicious person determination in consideration of switching even in a scene in which frame-out or hiding of a person frequently occurs.

Figure 10:
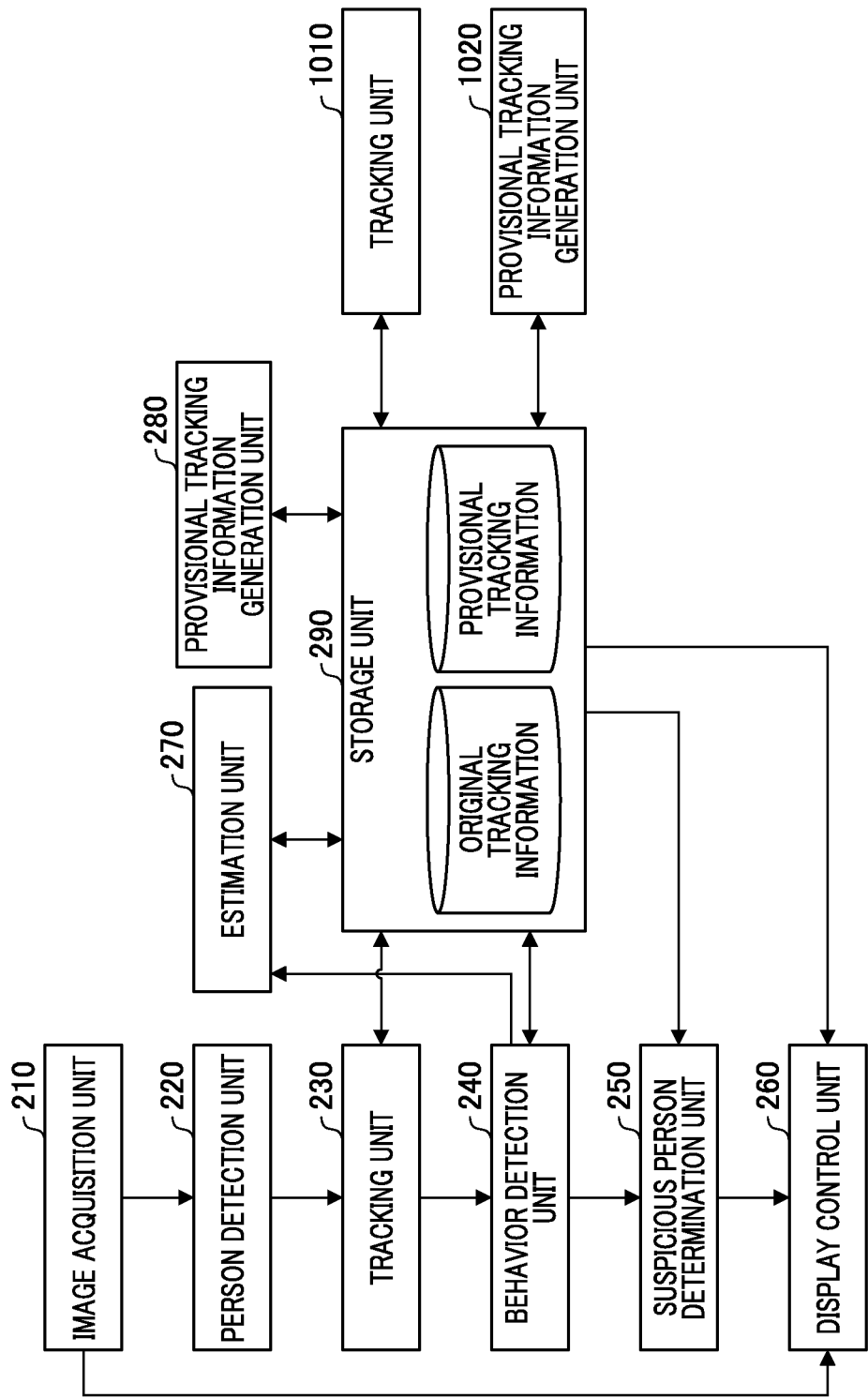
FIG. 10 is a block diagram of the functional configuration in the embodiments.

FIG. 10 is a diagram showing the configuration of the information processing apparatus 100 in the second embodiment. In the second embodiment, a tracking unit 1010 and a provisional tracking information generation unit 1020 are added as new component elements (functional units). Since the other component elements are the same as those in the first embodiment, redundant explanations will be omitted.

The tracking unit 1010 generates tracking information as a result of performing collation on a plurality of pieces of tracking information. The provisional tracking information generation unit 1020 generates provisional tracking information by combining the tracking information or the provisional tracking information. The provisional tracking information is tracking information estimated when switching is assumed.

In the second embodiment, similarly to the first embodiment, the video image shown in FIG. 4 is processed as a target, and a case in which a shoplifter in a store is detected as a suspicious person is assumed. Additionally, similarly to first embodiment, when it is considered that the same person takes a behavior of picking up a commodity on a shelf (first behavior) and a behavior of putting a commodity in a bag or the like (second behavior), the person is determined as a suspicious person. Additionally, similarly to the first embodiment, when the behavior of putting the item in a bag or the like is detected, a process of suspecting whether or not the same person has performed the behavior of picking up the item before that time.

In the second embodiment, the same processing is performed along the flow of the processes in FIG. 3 showing the processing in the first embodiment. However, the processing of generating the provisional tracking information in the S306 is different from that in the first embodiment. Accordingly, an explanation regarding the processing in FIG. 3 that overlaps the first embodiment will be omitted.

In the second embodiment, when the behavior detection unit 240 detects at least one predetermined behavior (an behavior of putting an item in a bag or the like), the tracking unit 1010 activates tracking processing and performs association regarding the tracking information that is before the behavior. Next, the provisional tracking information generation unit 280 performs the generation of the provisional tracking information based on the processing result of the estimation unit 270, for all the tracking information associated with the tracking information including the tracking information in which the prescribed behavior has been detected. Next, a provisional tracking information generation unit 1020 generates provisional tracking information by combining the provisional tracking information and the tracking information in the tracking information including the attention tracking information. The suspicious person determination unit 250 performs the determining of a suspicious person by using the provisional tracking information.

Figure 11:
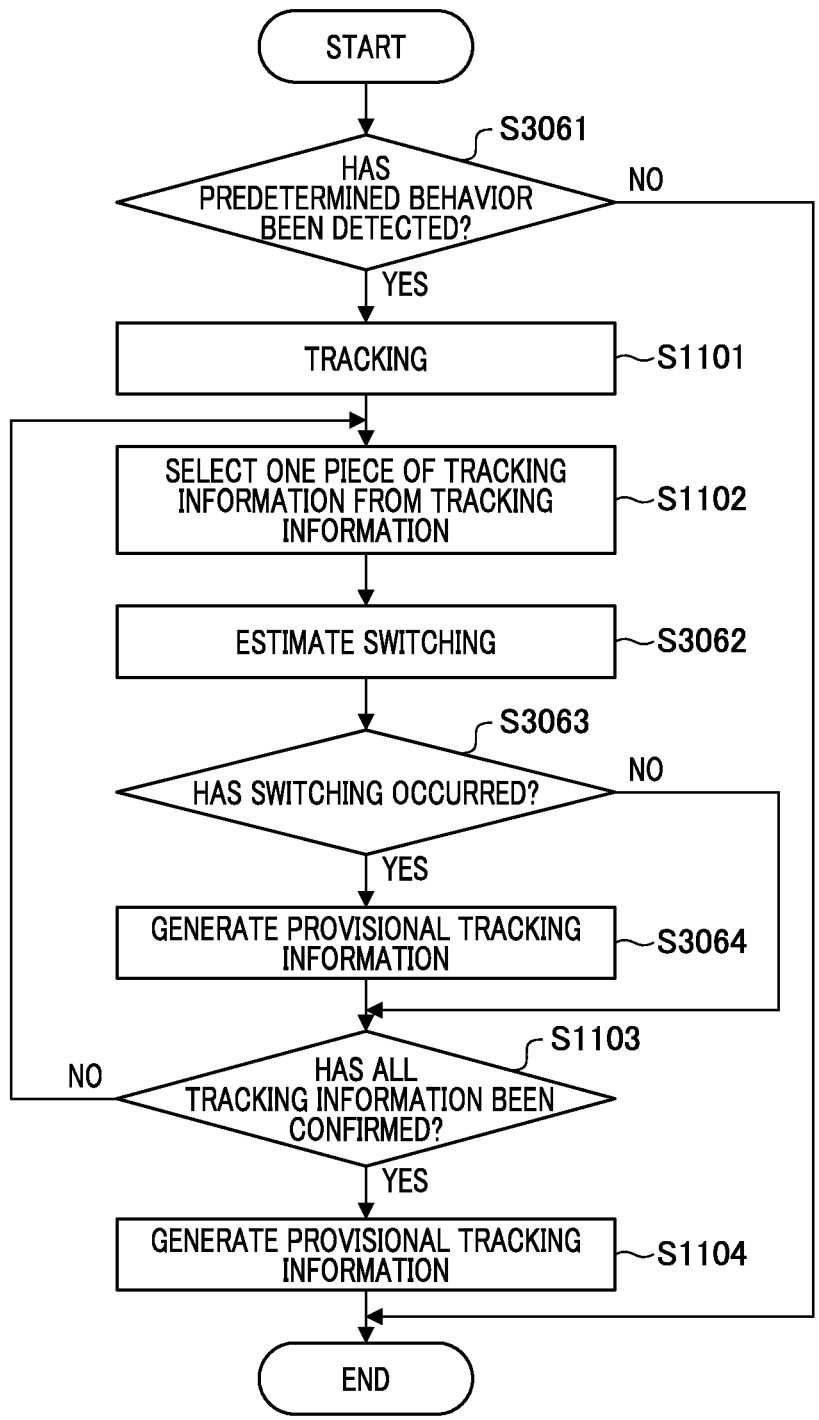
FIG. 11 is the processing flowchart in the embodiments.

In the following, the processes from S301 to S305 are simply omitted and assumed to have been completed. Accordingly, the process corresponding to S306 will be described in detail with reference to FIG. 11. FIG. 11 is a processing flowchart in the second embodiment.

First, in S3061, it is determined whether or not a predetermined behavior of putting an item in a bag or the like, which is a predetermined behavior, has been detected. When, as a result of the determination, the predetermined behavior is detected, the process proceeds to S1101. In contrast, if the predetermined behavior has not been detected, the process as shown in FIG. 11 ends, and the process proceeds to S307 and the process continues.

Next, in S1101, the tracking unit 1010 activates the tracking processing. The tracking unit 1010 generates tracking information as a result of performing collation on a plurality of pieces of tracking information. Here, tracking information (first tracking information) is generated by performing collation on all pieces of tracking information. An image of tracking information that the tracking unit 1010 generates is shown in FIG. 12.

Figure 12A:
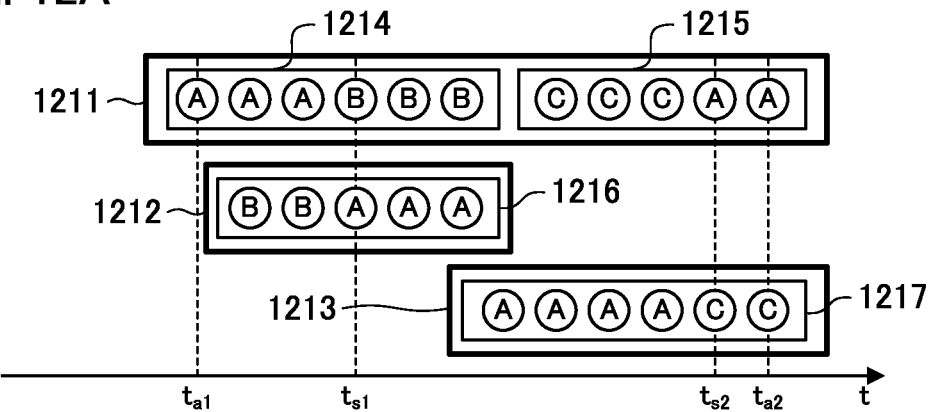
FIG. 12A to FIG. 12C are diagrams that explain the processing in the embodiments.
Figure 12B:
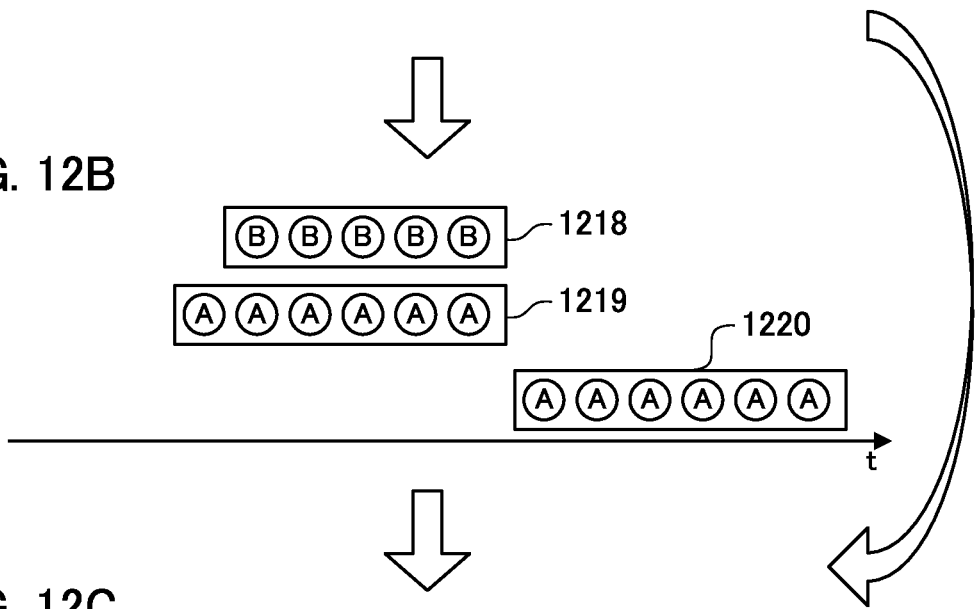
Figure 12C:
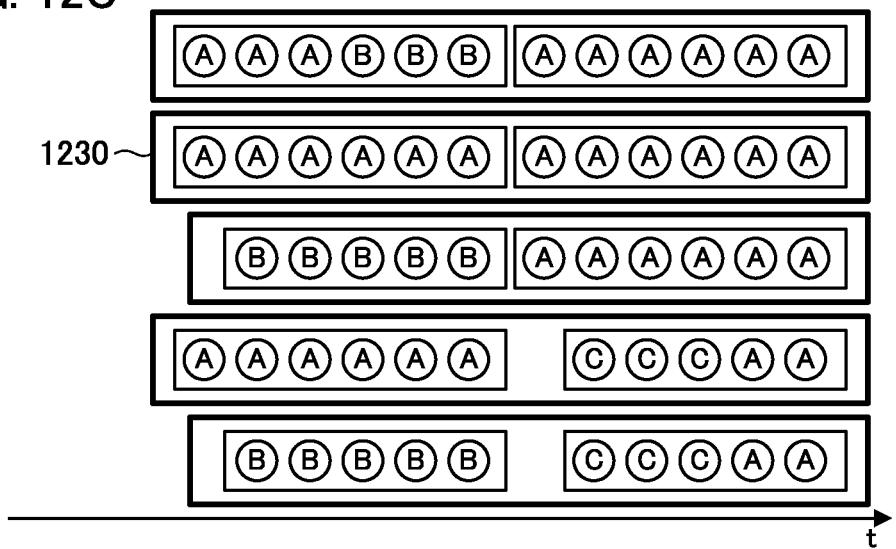

FIG. 12 is a diagram illustrating the processing in the second embodiment. FIG. 12A is an image of the tracking information that the tracking unit 1010 generates. FIG. 12B is an image of the provisional tracking information that the provisional tracking information generator 280 generates. FIG. 12C is an image in which a plurality of pieces of provisional tracking information is generated. t-axis represents time. Reference numerals 1211, 1212, and 1213, shown in rectangle with bold lines, respectively, indicate tracking information. In addition, a rectangle displayed inside the rectangle with bold lines indicates tracking information associated with that tracking information. A circle indicates one tracking element included in the tracking information. A text in the circle indicates a person who is actually correct. It is assumed that at time $t_{a1}$, a behavior of picking up an item on the shelf is detected from tracking information 1216, and at time $t_{a2}$, a behavior of putting an item in a bag or the like is detected from tracking information 1215. Additionally, switching occurs in tracking information 1214 and the tracking information 1216 at time $t_{s1}$. Furthermore, switching occurs in the tracking information 1215 and tracking information 1217 at time $t_{s2}$.

The description will return to FIG. 11, next, in S1102, the provisional tracking information generation unit 1020 selects one piece of tracking information from among tracking information including the tracking information in which a predetermined behavior has been detected. Using FIG. 12 as an example, the provisional tracking information generation unit 1020 selects the tracking information 1215.

Next, in S3062, the estimation unit 270 estimates tracking information that may have been switched with the tracking information (tracking information 1215) that the provisional tracking information generation unit 1020 has selected in S1103. Here, it is assumed that the tracking information 1217 is obtained as an estimation result.

Next, in S3063, it is determined, as a result of the estimation, whether
or not tracking information that may have been switched with the tracking information (tracking information 1215) is present. When it is determined, as a result of the determination, that the tracking information that may have been switched with the tracking information (tracking information 1215) is present, the process proceeds to S3064. If, in contrast, the tracking information that may have switched with the tracking information (tracking information 1215) is not present, the process proceeds to S1103.

Next, in S3064, the provisional tracking information generation unit 280 generates provisional tracking information as shown in FIG. 12B, by using the attention tracking information and the cross tracking information. Here, provisional tracking information 1220 is generated based on the tracking information 1215 and the tracking information 1217.

Next, in S1103, it is determined whether or not the processes from S1102 to S3064 have been completed for all pieces of tracking information included in the attention tracking information. When the processing has been completed for all pieces of the tracking information as a result of the determination, the process proceeds to S1104. In contrast, if the processing of all pieces of the tracking information is not completed, the process returns to S1102, and the same processing is repeated. Note that, here, the process proceeds to S1104, by assuming that, as a result of the iterative processing, provisional tracking information 1218 and provisional tracking information 1219 are generated in addition to the provisional tracking information 1220.

Next, in S1104, the provisional tracking information generation unit 1020 generates provisional tracking information (second tracking information) assuming switching by combining the original tracking information and the provisional tracking information. The provisional tracking information generation unit 1020 generates a plurality of pieces of provisional tracking information by combining the provisional tracking information and the tracking information belonging to the tracking information 1211 in which a prescribed behavior has been detected. Using FIG. 12 as an example, the provisional tracking information generation unit 1020 generates a plurality of pieces of provisional tracking information by combining the tracking information 1214 and the tracking information 1215, the provisional tracking information 1218, the provisional tracking information 1219, and the provisional tracking information 1220.

Note that, in the second embodiment, the provisional tracking information generated by the provisional tracking information generation unit 1020 and the tracking information generated by the tracking unit 1010 are separately managed by the storage unit 290. Separate management of the tracking information and the provisional tracking information has an advantage in that the above-described processing can be performed without dilating or overwriting the original information. Provisional tracking information can be generated by performing the processes from S3061 to S1104 as described above.

When the processes to this point is completed, the process proceeds to S308, and the determination of a suspicious person is performed by the suspicious person determination unit 250. Using FIG. 12 as an example, the suspicious person determination unit 250 determines that the corresponding person is a suspicious person due to the detection of behavior of picking up an item on a shelf and putting the item in a bag or the like based on the tracking information included in provisional tracking information 1230. The succeeding processes from S309 and S310 are the same as those in the first embodiment, and therefore the explanation will be omitted.

By the method as described above, in the information processing apparatus 100 in the second embodiment, it is possible to perform the determination of a suspicious persons using tracking processing, and overlooking of a suspicious persons can be suppressed, as in the first embodiment.

Note that although it has been described above that the tracking unit 1010 performs the collation on all pieces of tracking information, the tracking processing may be performed only on the attention tracking information 1215. According to this method, the processing of the tracking unit 1010 can be reduced (the processing cost can be reduced).

Note that, although, in the above explanation, the method for performing the processing according to the process flowchart in FIG. 11 has been described, the processing order of the information processing apparatus 100 according to the second embodiment is not limited thereto. For example, the tracking unit 1010 may perform tracking processing from the beginning. In this case, the same effect can be obtained.

Note that, although, it has been described in the above explanation that the storage unit 290 stores provisional tracking information, old information may be deleted. For example, the tracking information or the provisional tracking information is deleted after a predetermined period of time has passed after activation of tracking. Deleting unnecessary data helps to prevent an increase in memory load.

In the third embodiment, the determination of a suspicious person is performed on the assumption that three or more persons in the frame (on the screen) pass by each other at the same time, in a video image inside a store (in the store). In this case, since the provisional tracking information is generated taking the possibility of switching with a plurality of persons in consideration, the number of patterns of provisional tracking information increases. In that case, there is a possibility that many persons are erroneously determined as suspicious persons, in addition to an increase in memory load.

Accordingly, in the information processing apparatus 100 in the third embodiment, information stored in the storage unit 290 is reduced by assigning an evaluation value to each piece of the provisional tracking information. In addition, provisional tracking information is generated by using tracking information with a higher possibility that the switching has occurred so that the suspicious person is determined.

Figure 13:
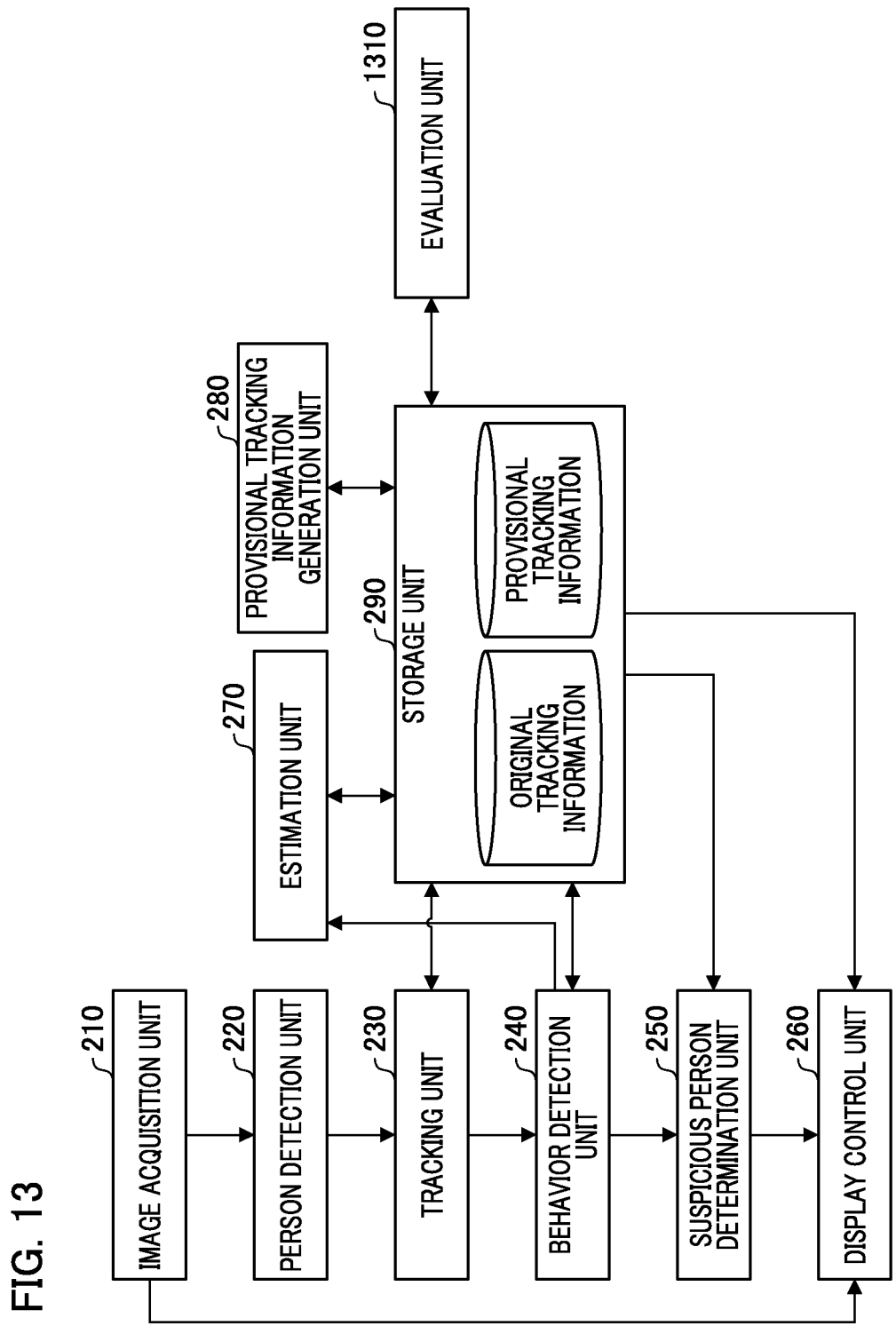
FIG. 13 is a block diagram of the functional configuration in the embodiments.

FIG. 13 is a diagram showing the configuration of the information processing apparatus 100 in the third embodiment. In the third embodiment, an evaluation unit 1310 is added as a new component element (functional unit). Since the other component elements are the same as those in first embodiment, redundant explanations will be omitted.

The evaluation unit 1310 calculates an evaluation value indicating a possibility that switching has occurred for each piece of the provisional tracking information. In the third embodiment, the storage unit 290 manages the evaluation value by associating with each piece of provisional tracking information.

Although, in the processing in the third embodiment, the same processing is performed along the flow of the processes in FIG. 3 showing the processing in the first embodiment, the processing in which the evaluation unit 1310 evaluates the provisional tracking information after generating the provisional tracking information in S3064 is different from that in the first embodiment. Accordingly, an explanation regarding the processing in FIG. 3, which is redundant that in the first embodiment, will be omitted.

Here, it is assumed that the processing up to S3064 is completed by the processing that is the same as the first embodiment, and next, the evaluation processing by the evaluation unit 1310 is performed. In the third embodiment, the evaluation unit 1310 performs evaluation by a method based on a degree of reliability. Here, the degree of reliability is an index indicating whether or not a condition for estimating switching is appropriate.

Additionally, the degree of reliability is determined using the tracking information. For example, when switching occurs at the back of the screen, a person is small, and it is difficult to estimate the person. Therefore, the evaluation unit 1310 performs the processing of lowering the degree of reliability when it is considered that a person having a small size of the detection frame of the tracking information has been switched. As a method for determining the evaluation value, for example, the degree of reliability may be directly used as the evaluation value. Here, the storage unit 290 selects provisional tracking information to be stored based on the evaluation value. Specifically, an increase in memory load is suppressed by leaving only provisional tracking information having an evaluation value that is a predetermined threshold or more. Note that the tracking information having an evaluation value that is less than a predetermined threshold may, for example, be deleted or may be moved and stored in a storage medium that is different from the storage unit 290.

Next, in S307, behavior detection is performed on the provisional tracking information. Next, in S308, the suspicious person determination unit 250 performs the determination of a suspicious person. Here, the behavior detection unit 240 and the suspicious person determination unit 250 perform processing by referring to the provisional tracking information of the storage unit 290. Since the storage unit 290 selects and leaves the provisional tracking information based on the evaluation value, the tracking information that is processing target of the behavior detection unit 240 and the suspicious person determination unit 250 is carefully selected data. When the number of patterns of the provisional tracking information is large, the amount of data to be processed is reduced, and thus efficiency is improved.

Next, in S309, the display control unit 260 performs the display processing, as in the first embodiment. In the third embodiment, the display control unit 260 causes the information on the provisional tracking information and the information on the evaluation value together to be displayed on the display unit 105. For example, when the detection frame is highlighted on the frame by the method in the first embodiment, the evaluation value may be displayed around the detection frame, or the color of the detection frame may be changed according to the evaluation value. Both help the user to determine how trustworthy the provisional information is when the user views the display.

Finally, in S310, it is determined whether or not a series of processes for determining a suspicious person has been completed for all frames. As a result of the determination, if a series of processes has been completed for all frames, the processing ends. In contrast, if a series of processes have not been completed for all frames, the process returns to S302, and the processes from S302 to S310 are repeated.

According to the above-described method, in the information processing apparatus 100 in the third embodiment, the information stored in the storage unit 290 is reduced by assigning evaluation values to each piece of provisional tracking information. In addition, the provisional tracking information is generated using the tracking information with a higher possibility that the switching has occurred, and consequently, the determination of a suspicious person becomes possible.

Note that, although the method for using the tracking information, which is a method for determining the degree of reliability, has been described as above, the degree of reliability can also be determined based on the image quality. For example, a case is assumed in which the determination of switching from the video image is impossible due to a noise entering the entire frame. In such a case, for example, a convolutional neural network (CNN) in which learning is performed to detect noise is applied to a frame, so that the degree of reliability is lowered when there is much noise. That is, the degree of reliability can be determined sequentially according to the level of noise.

Note that, although in the above description the method based on the degree of reliability, which is the evaluation method performed by the evaluation unit 1310, has been explained, there is a method based on the degree of certainty of switching in addition to this method. It is assumed that the degree of certainty is the possibility that switching has occurred. In this method, it is necessary to acquire the above-described degree of certainty of switching when the estimation unit 270 performs the estimation processing. The method for calculating the degree of certainty will be explained below.

First, the case in which a method based on positional relation is used as an estimation method will be explained. In the case of the estimation by the method based on a distance, for example, the reciprocal number of the distance when two detection frames come close to each other again is used as the degree of certainty. Additionally, in the case of the estimation by the method based on overlap, for example, the degree of certainty is increased as the area when the overlap area of the two detection frames becomes the maximum is larger. That is, the degree of certainty can be sequentially determined according to the degree of overlap between the detection frames.

Next, the case in which the method based on image features as described above is used as the estimation method will be described. In the method based on the degree of similarity or the method using clustering, when there is an image feature having a high degree of similarity between two pieces of tracking information, the degree of certainty is set to 1 or a value close to 1. When there is no image feature having a high degree of similarity between the two pieces of tracking information, the degree of certainty is set to 0 or a value close to 0. Additionally, when face authentication is used as the estimation method, for example, when the face of the same person is detected from two pieces of tracking information which may have been switched, the degree of certainty is set to 1, and, when the face is not detected, the degree of certainty is set to 0.

FIG. 14 is a diagram illustrating data handled in the third embodiment. FIG. 14A is an image in which the degree of certainty is calculated for each piece of provisional tracking information and an evaluation value is calculated based on the degree of certainty. FIG. 14B is an image in which a degree of priority and a weight corresponding to the degree of priority are determined for each of the estimation methods. It is assumed that x1 and x2 as shown in FIG. 14 are the degrees of certainty obtained by different estimation methods. For example, x1 is the degree of certainty in the method based on distance. x2 is the degree of certainty in the method based on clustering.

As a method for obtaining the evaluation value, for example, the sum of the degrees of certainty can be used as the evaluation value. Specifically, the evaluation value can be obtained by the following formula (1), where "s" is the evaluation value.

$$s = x1 + x2 \tag{1}$$

According to this method, the same effect as the method based on the degree of reliability as described above can be obtained.

Note that when the evaluation value is obtained based on the degree of certainty, a degree of priority may be set in advance for each degree of certainty, and the evaluation value may be calculated based on the degree of certainty and the degree of priority. Specifically, a degree of priority and a weight corresponding to the degree of priority are determined for each of the estimation method as shown in FIG. 14B. Here, the weight w1 and the weight w2 are set such that as the degree of priority increases, the weighting increases. The evaluation value can be obtained, for example, by the following formula (2) by performing weighting to the degree of certainty based on the degree of priority.

$$s = w1 \times x1 + w2 \times x2 \tag{2}$$

As described above, when the degree of priority is set, for example, in a scene in which there are many persons having similar clothes, it is possible to perform evaluation in which the degree of priority of the method based on the degree of similarity is lowered and the method based on the face authentication is emphasized (weighting is increased). Therefore, an appropriate evaluation value can be obtained according to the scene.

Note that, although, in the above description, the method based on the degree of reliability and the method based on the degree of certainty of switching have been explained, these methods may be combined to obtain an evaluation value. For example, the evaluation value can be obtained by the following formula (3) based on the sum of a value based on the degree of certainty and the degree of priority and the degree of reliability r.

$$s = w1 \times x1 + w2 \times x2 + r \tag{3}$$

According to this method, comprehensive evaluation can be performed from a plurality of viewpoints.

Note that, in the above description, it has been described that the storage unit 290 selects the provisional tracking information based on the evaluation value. However, the provisional tracking information having the evaluation value s may be left in the storage unit 290, and the behavior detection unit 240 and the suspicious person determination unit 250 may perform processing only on data having a high evaluation value. Additionally, by this method, the processing cost can be suppressed.

Although the preferred embodiments of the present invention have been described as above, the present invention is not limited to these embodiments, and various modifications and changes can be made within the scope of the gist of the present invention. For example, some of the functional blocks illustrated in FIG. 2 may be included in an apparatus that is different from the information processing apparatus 100. More specifically, a storage device that is different from the information processing apparatus 100 may have the function of the storage unit 290, and the information processing apparatus 100 and the storage device may perform communication based on wired or wireless connection to realize the function of each embodiment. Similarly, one or a plurality of functional blocks in FIG. 2 such as the tracking unit 230, the behavior detection unit 240, the suspicious person determination unit 250, and/or the provisional tracking information generation unit 280 may be realized by one or a plurality of computers that is different from the information processing apparatus 100. The information processing apparatus 100 may also have an image capturing function. In this case, for example, the information processing apparatus 100 may have the imaging unit and the person detection unit 220, and one or a plurality of apparatuses that are different from the information processing apparatus 100 may have functions other than the person detection unit 220 in FIG. 2, or the information processing apparatus 100 may have an image capturing function in addition to all the functions in FIG. 2. The same applies to FIG. 10 and FIG. 13.

The present invention can also be realized by processing in which a program for realizing one or more functions of the above-described embodiments is supplied to a system or an apparatus via a network or a storage medium, and one or more processors in a computer of the system or the apparatus read and execute the program. In this case, a storage medium storing the program constitutes the present invention. Additionally, the present invention can also be realized by a circuit (for example, an ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-084454, May 24, 2022, which is hereby incorporated by reference wherein in its entirety.

What is claimed is:

1. An information processing apparatus comprising:
   one or more memories storing instructions; and
   one or more processors executing the instructions to:
   detect a predetermined behavior in a person;
   specify first tracking information of a first person for which the predetermined behavior has been detected and second tracking information of a second person for which it is estimated that replacement has occurred during movement of the first person;
   generate third tracking information based on the first tracking information and the second tracking information; and
   determine whether or not the first person satisfies a predetermined condition based on a detection result of the predetermined behavior corresponding to the third tracking information.

2. The information processing apparatus according to claim 1,
   wherein the predetermined behavior includes a first behavior and a second behavior that is different from the first behavior, and the one or more processors determines that the first person satisfies the predetermined condition if a person corresponding to the third tracking information performs the second behavior after the first behavior.

3. The information processing apparatus according to claim 2,
   wherein the first behavior is a behavior of picking up an object, and the second behavior is a behavior of putting the object in at least one of a bag, a purse, a sack, and a pocket.

4. The information processing apparatus according to claim 1,
   wherein the one or more processors further specify fourth tracking information of a fourth person who is estimated to have been replaced while the second person is moving, generate fifth tracking information based on the third tracking information and the fourth tracking information, and determine whether or not the first person satisfies the predetermined condition based on a detection result of the predetermined behavior corresponding to the fifth tracking information.

5. The information processing apparatus according to claim 1,
   wherein the one or more processors generates the third tracking information by rearranging a part of the first tracking information and a part of the second tracking information based on the time when the replacement occurs.

6. The information processing apparatus according to claim 1,
   wherein the one or more processors generate the third tracking information based on similarity of image features of a person corresponding to the first tracking information and a person corresponding to the second tracking information.

7. The information processing apparatus according to claim 1,
   wherein the one or more processors generate the third tracking information based on a result of performing face authentication on each of a person corresponding to the first tracking information and a person corresponding to the second tracking information.

8. The information processing apparatus according to claim 1,
   wherein the one or more processors perform the estimation by using at least one of position information and similarity of image feature of each of a person corresponding to the first tracking information and a person corresponding to the second tracking information.

9. The information processing apparatus according to claim 1,
   wherein the one or more processors perform the estimation using at least one of distance information and overlap information between a person corresponding to the first tracking information and a person corresponding to the second tracking information.

10. The information processing apparatus according to claim 1,
    wherein the one or more processors cause information on the first, second, and third tracking information to be displayed on a screen of a display device.

11. The information processing apparatus according to claim 10,
    wherein the one or more processors cause tracking information of a person determined to be a person who satisfies the predetermined conditions to be displayed differently from other tracking information on the screen.

12. The information processing apparatus according to claim 11,
    wherein the one or more processors highlight the surrounding area of a person corresponding to tracking information in which the predetermined behavior has been detected.

13. The information processing apparatus according to claim 11,
    wherein the one or more processors cut out an image range of a person corresponding to tracking information in which the predetermined behavior has been detected, and cause the image range to be displayed on a screen of the display device.

14. The information processing apparatus according to claim 1,
    wherein the one or more processors store information on a section corresponding to tracking information of a person determined to satisfy the predetermined condition and/or a video image of the section.

15. The information processing apparatus according to claim 1,
wherein the one or more processors generate a plurality of pieces of tracking information based on a plurality of pieces of tracking information, and perform the determination based on the plurality of pieces of tracking information.

16. The information processing apparatus according to claim 1,
wherein the one or more processors determine an evaluation value indicating a possibility of the replacement for each of a plurality of pieces of tracking information, and execute at least one of executing the determination using tracking information whose evaluation value is higher than a threshold and displaying the evaluation value on a display screen.

17. The information processing apparatus according to claim 16, wherein the one or more processors determine the evaluation value based on at least one of a size of a person in a display screen and an image quality of a video image.

18. A control method of an information processing apparatus comprising:
detecting a predetermined behavior in a person;
specifying first tracking information of a first person for which the predetermined behavior has been detected and second tracking information of a second person for which it is estimated that replacement has occurred during movement of the first person;
generating third tracking information based on the first tracking information and the second tracking information; and
determining whether or not the first person satisfies a predetermined condition based on a detection result of the predetermined behavior corresponding to the third tracking information.

19. A non-transitory computer-readable storage medium configured to store a computer program comprising instructions for executing the following processes:
detecting a predetermined behavior of a person;
specifying first tracking information of a first person for which the predetermined behavior has been detected and second tracking information of a second person for which it is estimated that replacement has occurred during movement of the first person;
generating third tracking information based on the first tracking information and the second tracking information; and
determining whether or not the first person satisfies a predetermined condition based on a detection result of the predetermined behavior corresponding to the third tracking information.

* * * * *